US012216888B2

(12) United States Patent
Hassan et al.

(10) Patent No.: US 12,216,888 B2
(45) Date of Patent: Feb. 4, 2025

(54) AUTOMATION OF PERMISSION CONTROLS FOR GROUP MESSAGES

(71) Applicant: MICROSOFT TECHNOLOGY LICENSING, LLC, Redmond, WA (US)

(72) Inventors: Amer Aref Hassan, Kirkland, WA (US); Wei-Chen Chen, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/829,309

(22) Filed: May 31, 2022

(65) Prior Publication Data

US 2023/0384913 A1   Nov. 30, 2023

(51) Int. Cl.
*G06F 3/0484* (2022.01)
*H04L 51/216* (2022.01)

(52) U.S. Cl.
CPC .......... *G06F 3/0484* (2013.01); *H04L 51/216* (2022.05); *G06F 2203/04803* (2013.01)

(58) Field of Classification Search
CPC ......... G06F 3/0484; G06F 2203/04803; H04L 51/216
See application file for complete search history.

(56) References Cited

U.S. PATENT DOCUMENTS

| 8,473,553 | B2 * | 6/2013 | McDevitt | G06Q 10/107 709/208 |
| 10,440,436 | B1 * | 10/2019 | Taylor | H04N 21/812 |
| 11,432,047 | B1 * | 8/2022 | Panchaksharaiah | H04N 21/44218 |
| 11,451,667 | B1 * | 9/2022 | Chau | H04L 65/1096 |
| 2003/0074451 | A1 * | 4/2003 | Parker | H04L 61/10 709/227 |
| 2007/0168446 | A1 * | 7/2007 | Keohane | H04L 51/04 709/207 |

(Continued)

OTHER PUBLICATIONS

White, Scott G., "Zoom Host Guide", Archived Oct. 30, 2021, medicine.uiowa.edu, https://web.archive.org/web/20211030162659/https://medicine.uiowa.edu/ocrme/sites/medicine.uiowa.edu.ocrme/files/Zoom-Host-Guide.pdf, pp. 1-96. (Year: 2021).*

(Continued)

*Primary Examiner* — Daniel W Parcher
(74) *Attorney, Agent, or Firm* — Scott Y. Shigeta; Newport IP, LLC

(57) ABSTRACT

A system provides permission controls for group messages. A system can support user accessibility by the use of a permissions that indicates that a user has accessibility needs with respect to a voice input. When a user is known to have accessibility issue with providing a voice input, a system data structure, such as a Teams directory, can indicate when specific users have special needs. The system can grant them with rights to prevent others from providing messages to a message thread. This allows that person to become a presenter of a meeting while using a message thread to give their presentation without interruption from others. The system can unlock the thread and allow others to provide messages when the user is done with their presentation. By controlling a message thread in this manner, a system can allow users having special needs to participate as a meeting presenter.

19 Claims, 32 Drawing Sheets

(56) References Cited

U.S. PATENT DOCUMENTS

| | | | |
|---|---|---|---|
| 2008/0046512 A1* | 2/2008 | Jones | G06Q 10/107 |
| | | | 709/204 |
| 2009/0063645 A1* | 3/2009 | Casey | H04N 21/4788 |
| | | | 709/206 |
| 2016/0255126 A1* | 9/2016 | Sarris | H04L 65/1096 |
| | | | 348/14.08 |
| 2017/0272388 A1* | 9/2017 | Bern | H04L 51/04 |
| 2020/0327891 A1 | 10/2020 | Chhabra et al. | |
| 2020/0349429 A1 | 11/2020 | Vendrow et al. | |
| 2020/0366629 A1 | 11/2020 | Jalil | |
| 2022/0150205 A1* | 5/2022 | Cha | G06F 21/6218 |
| 2022/0286625 A1* | 9/2022 | Afrasiabi | H04L 65/403 |

OTHER PUBLICATIONS

"International Search Report and Written Opinion Issued in PCT Application No. PCT/US23/018256", Mailed Date: Jul. 7, 2023, 11 Pages.

* cited by examiner

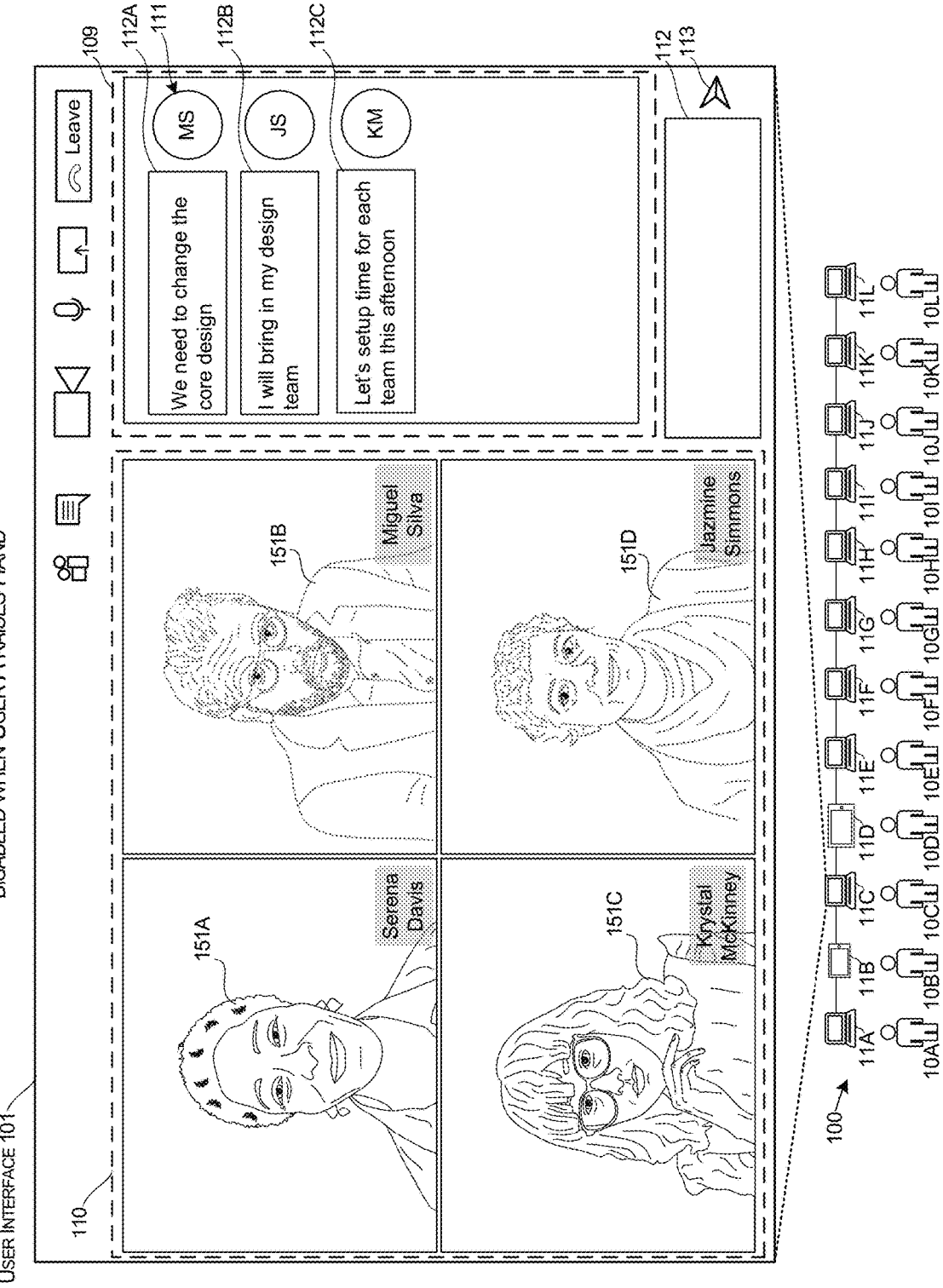

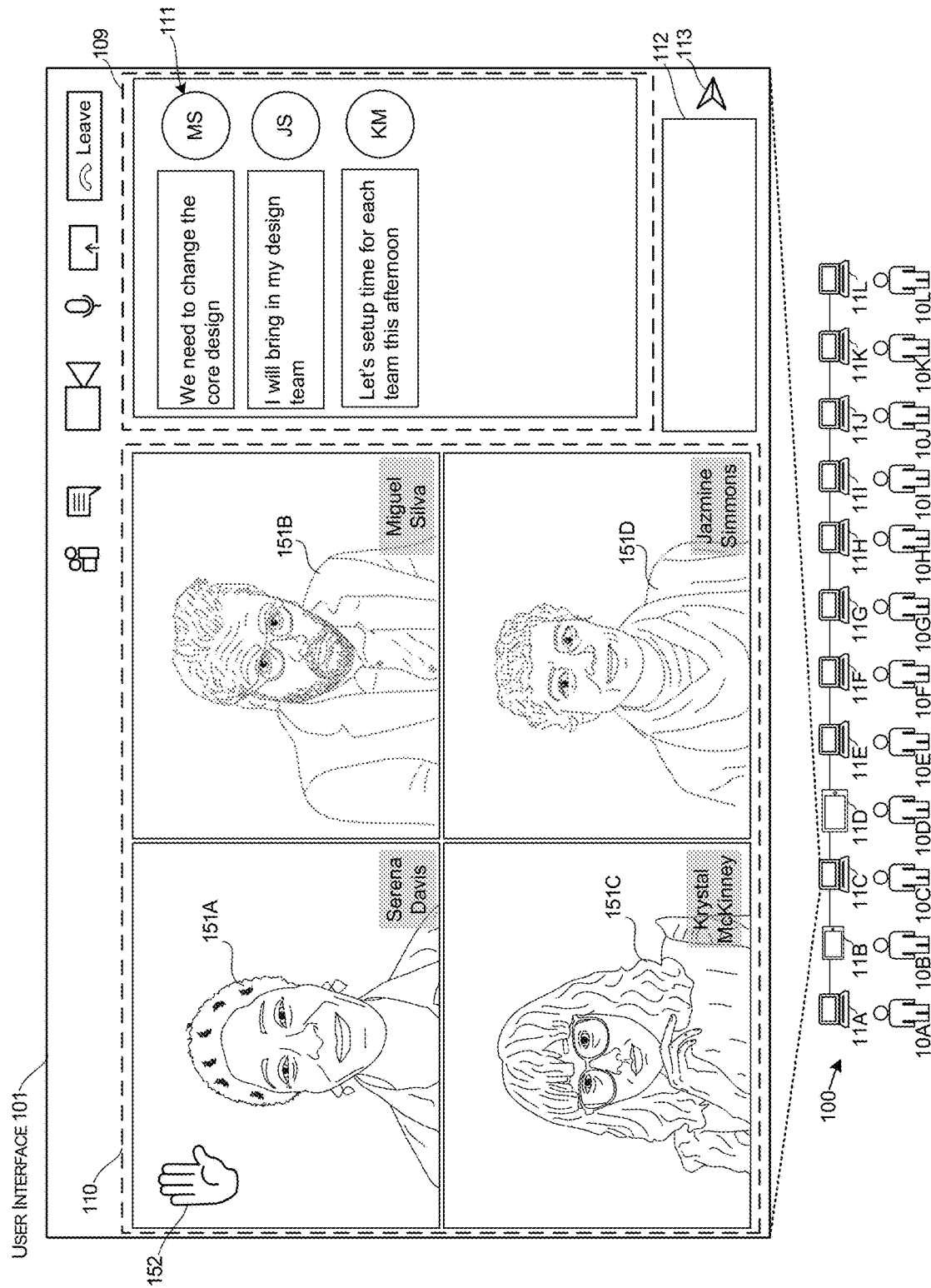

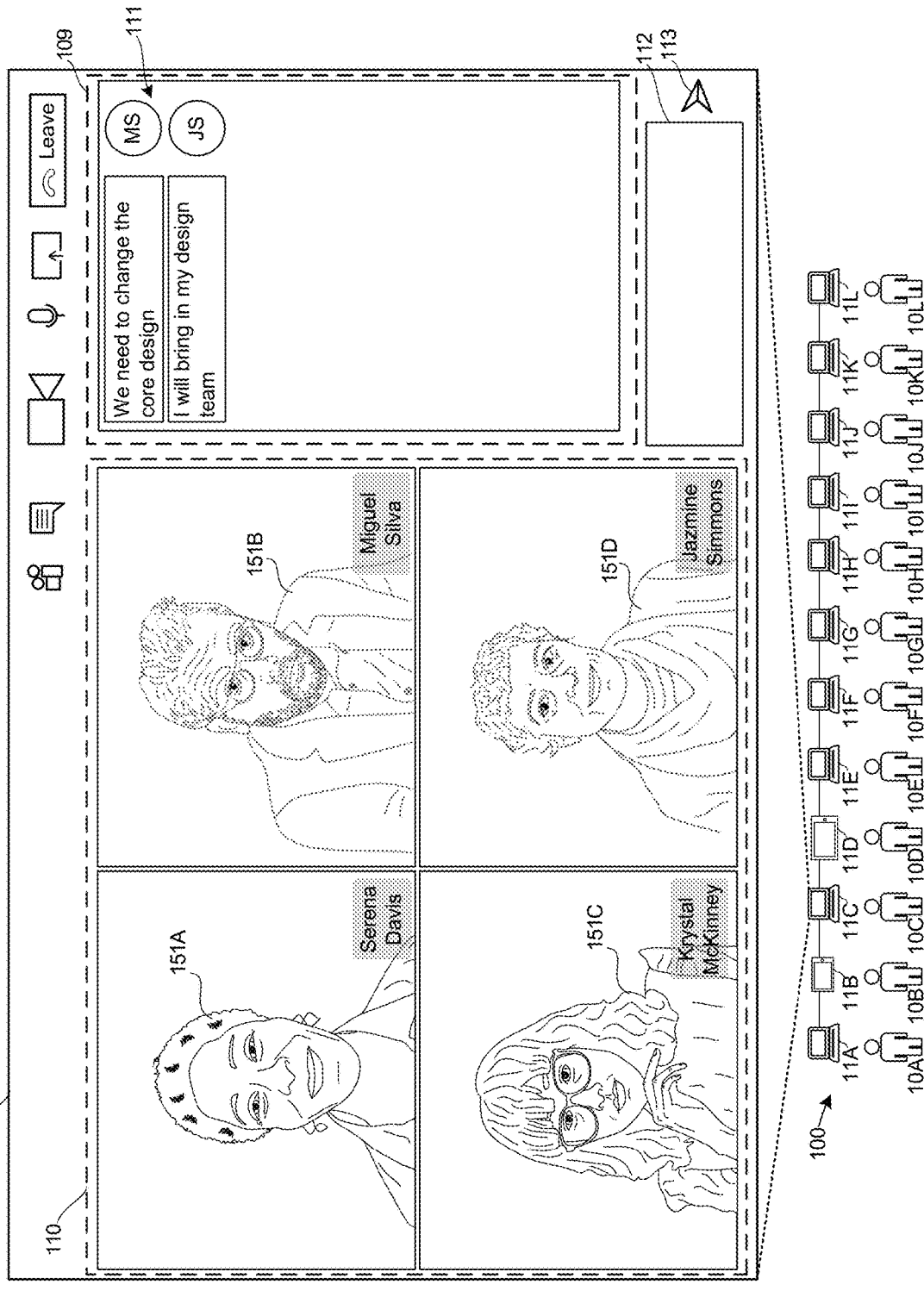

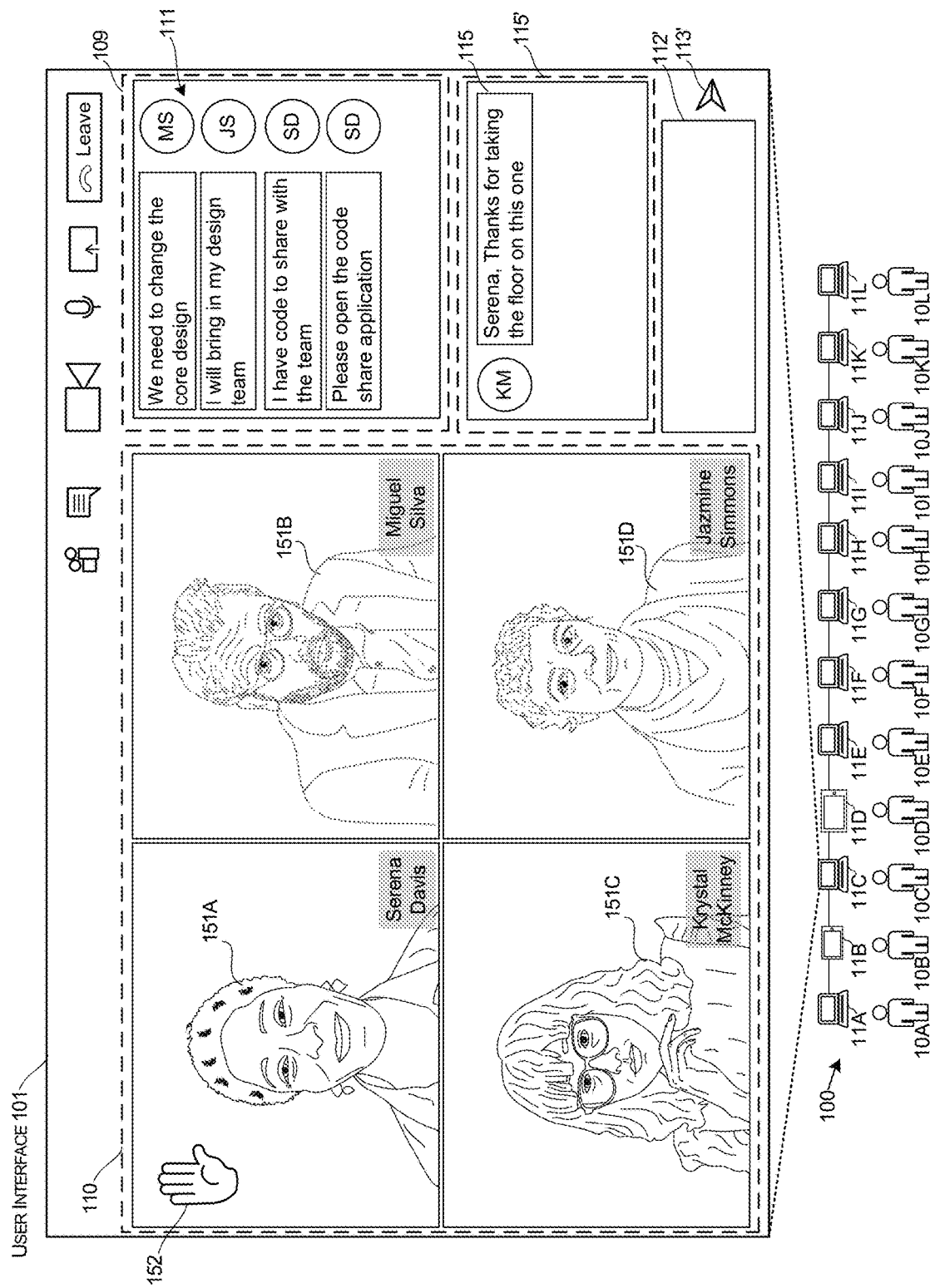

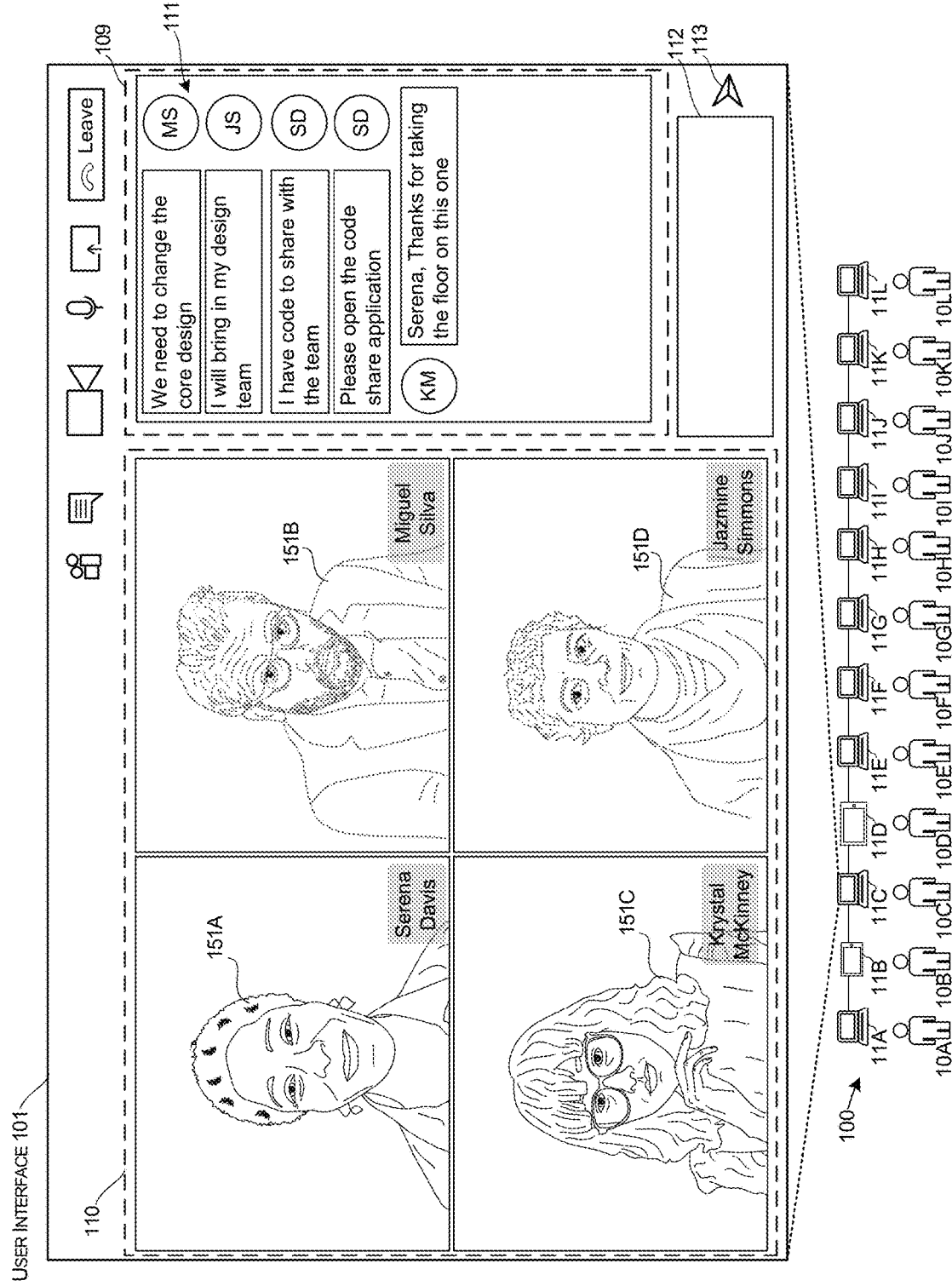

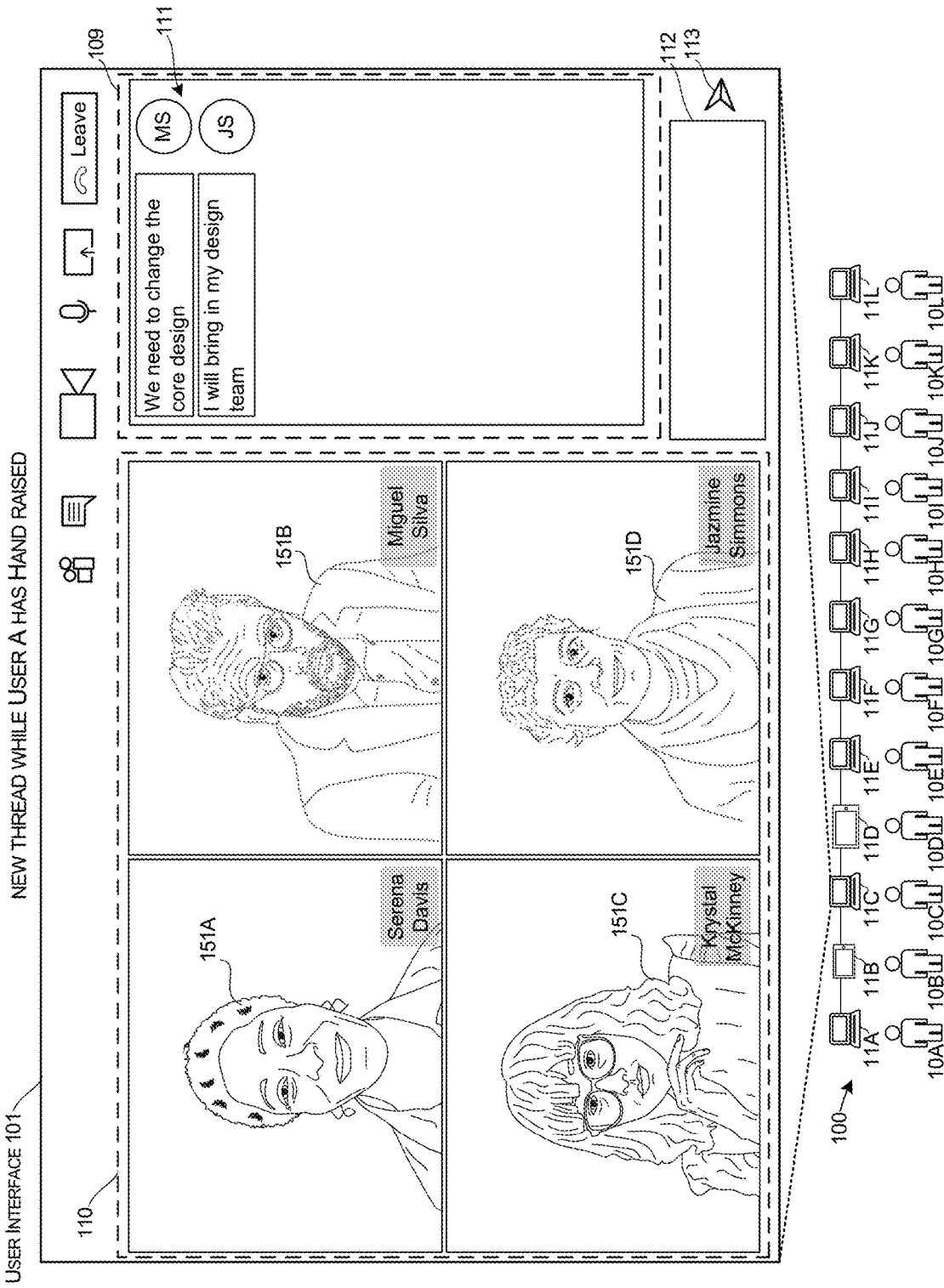

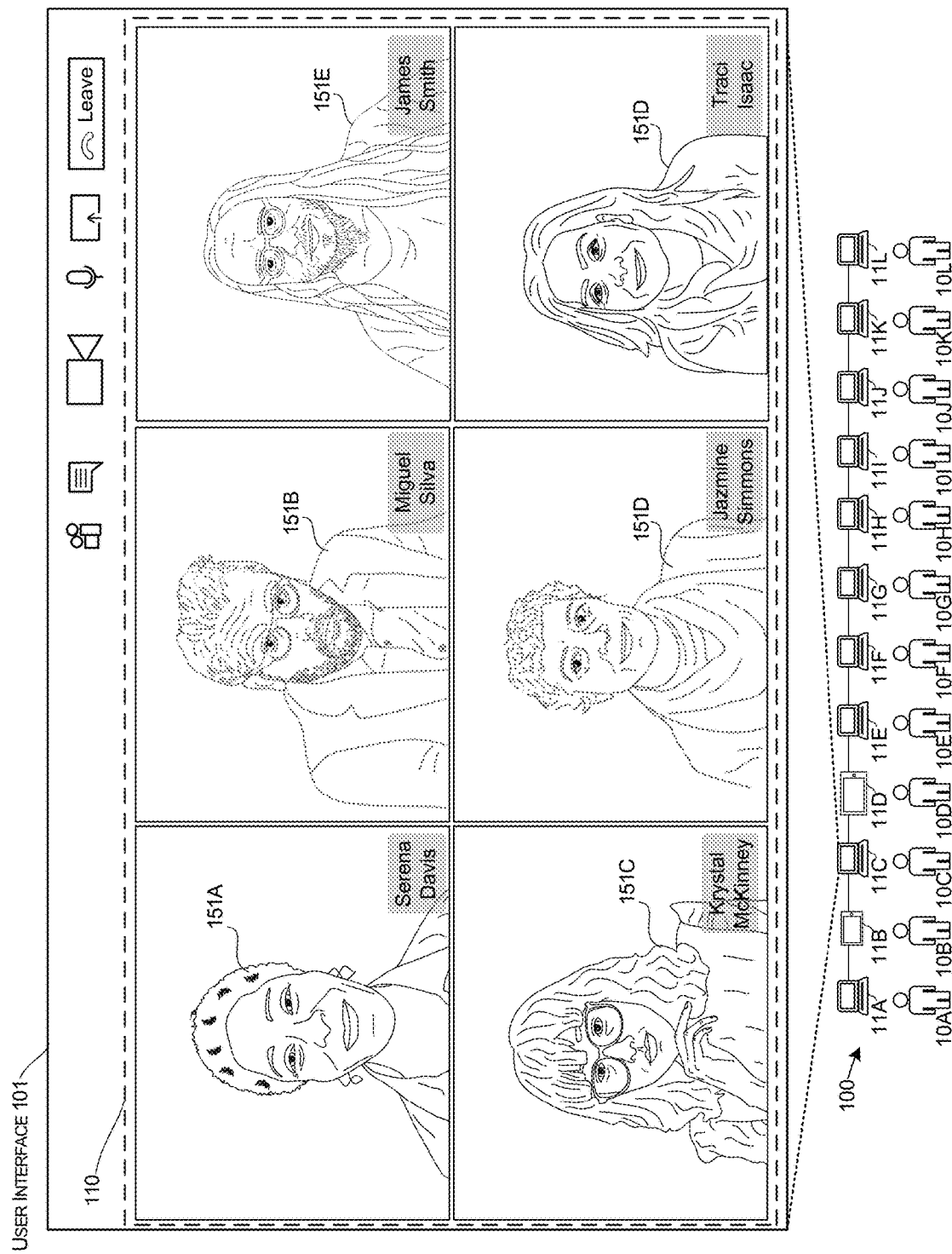

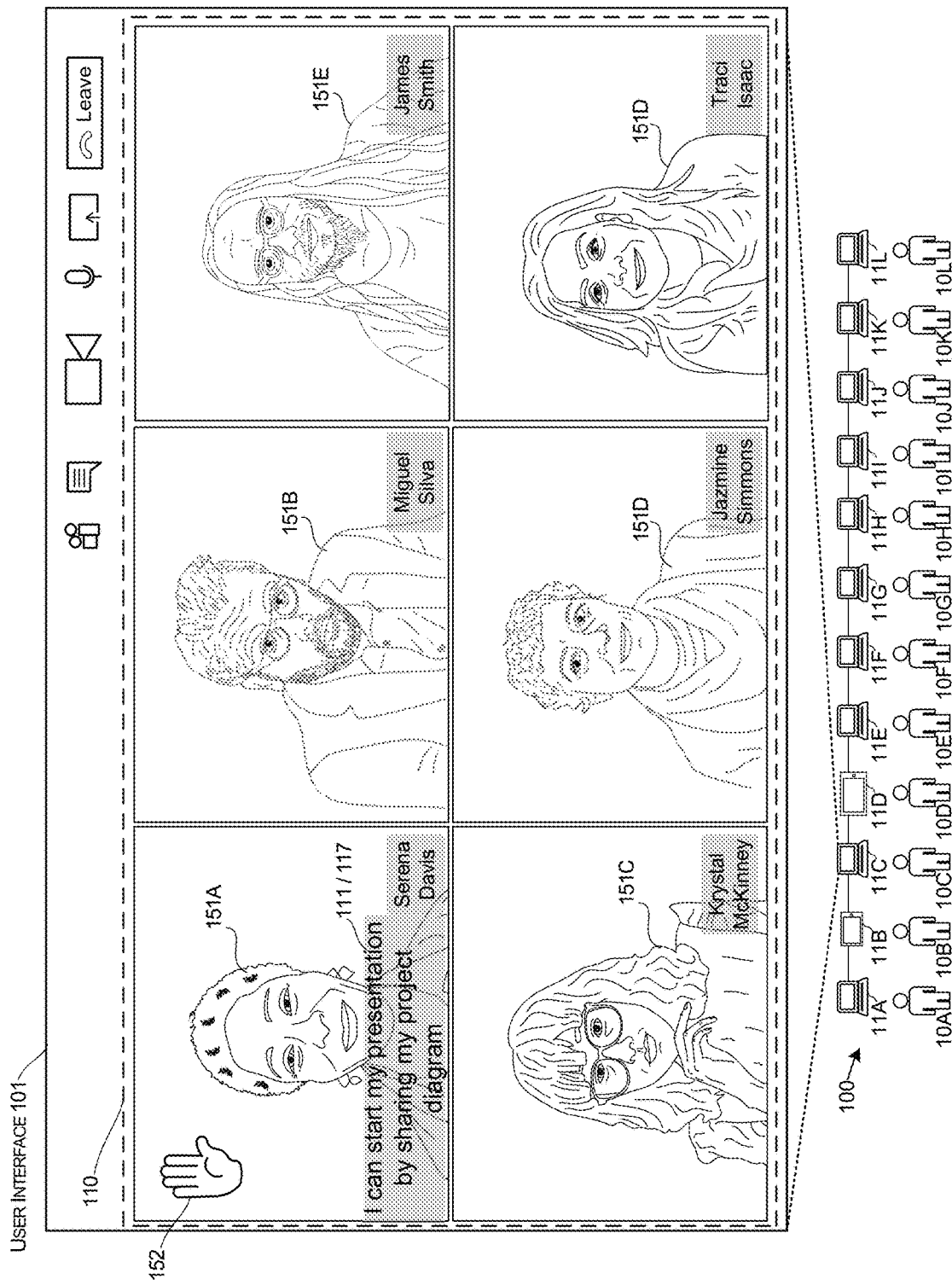

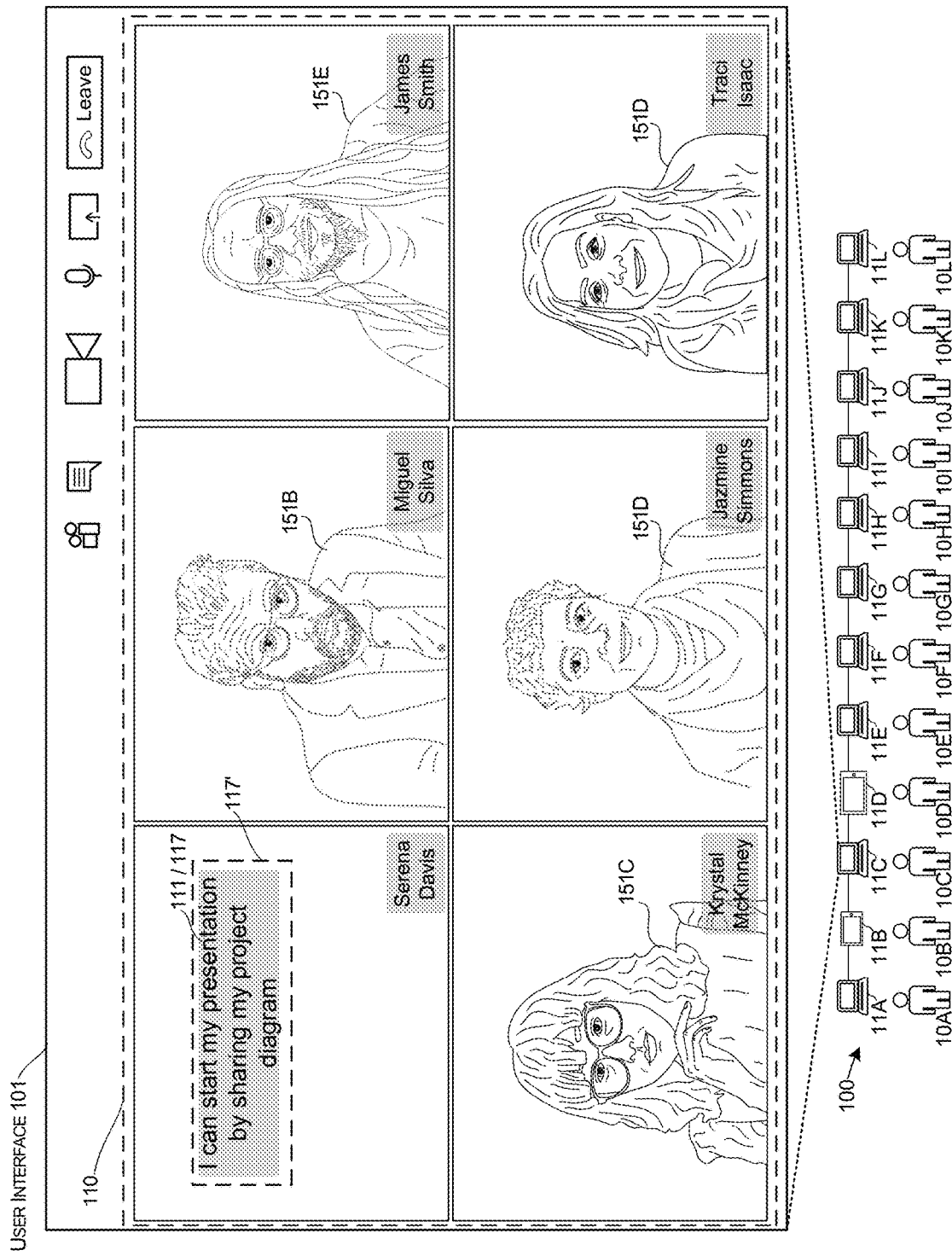

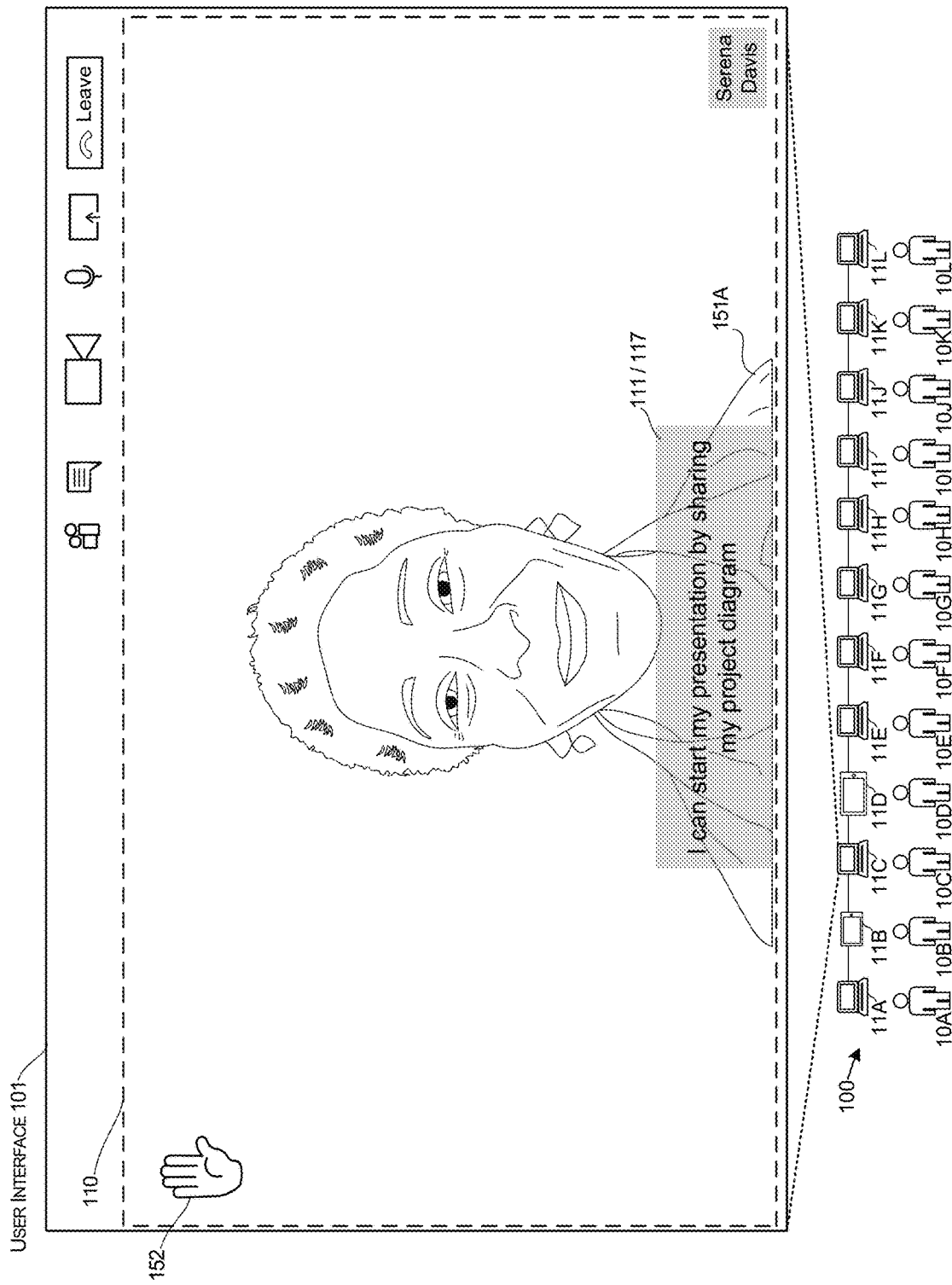

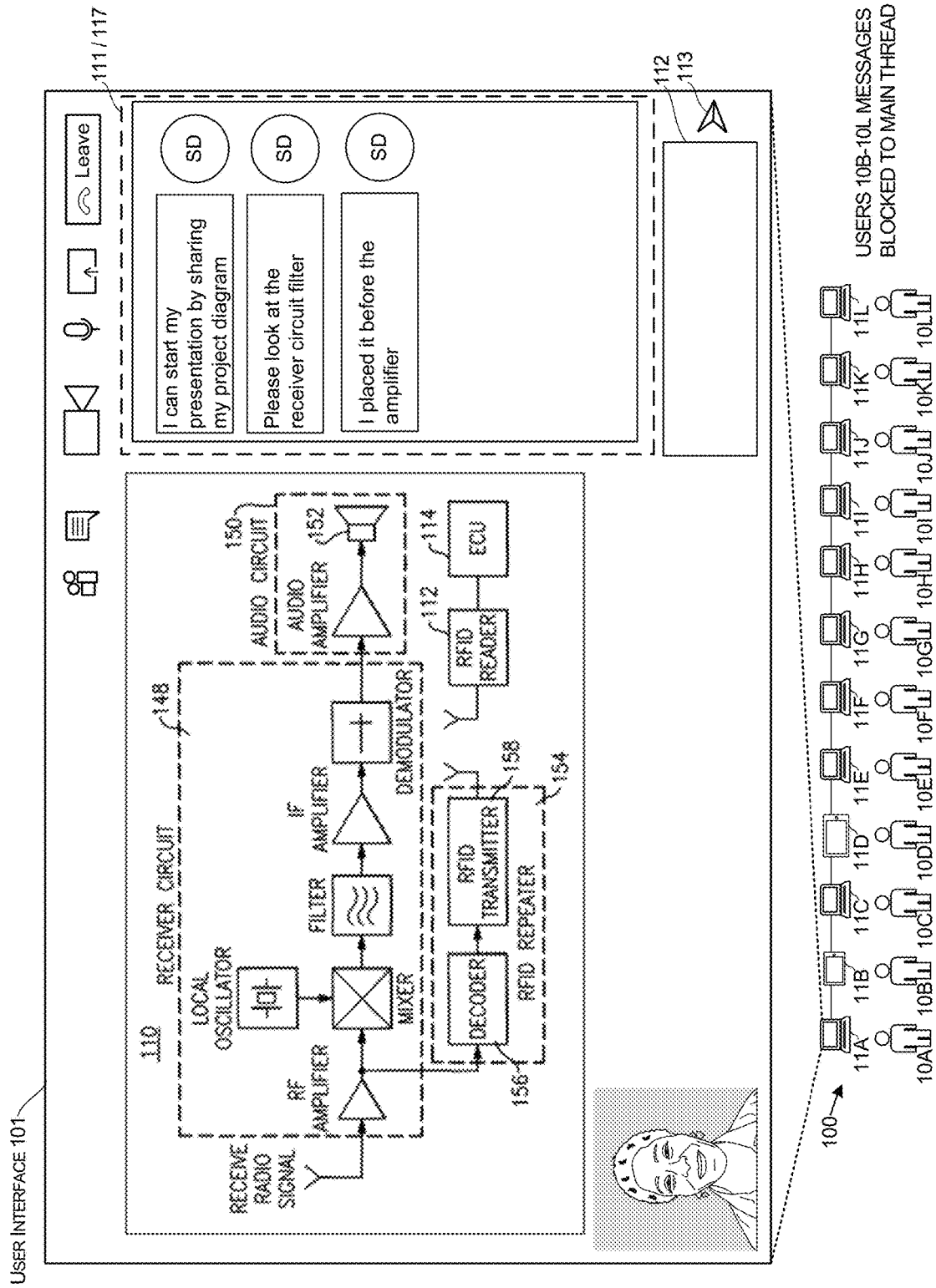

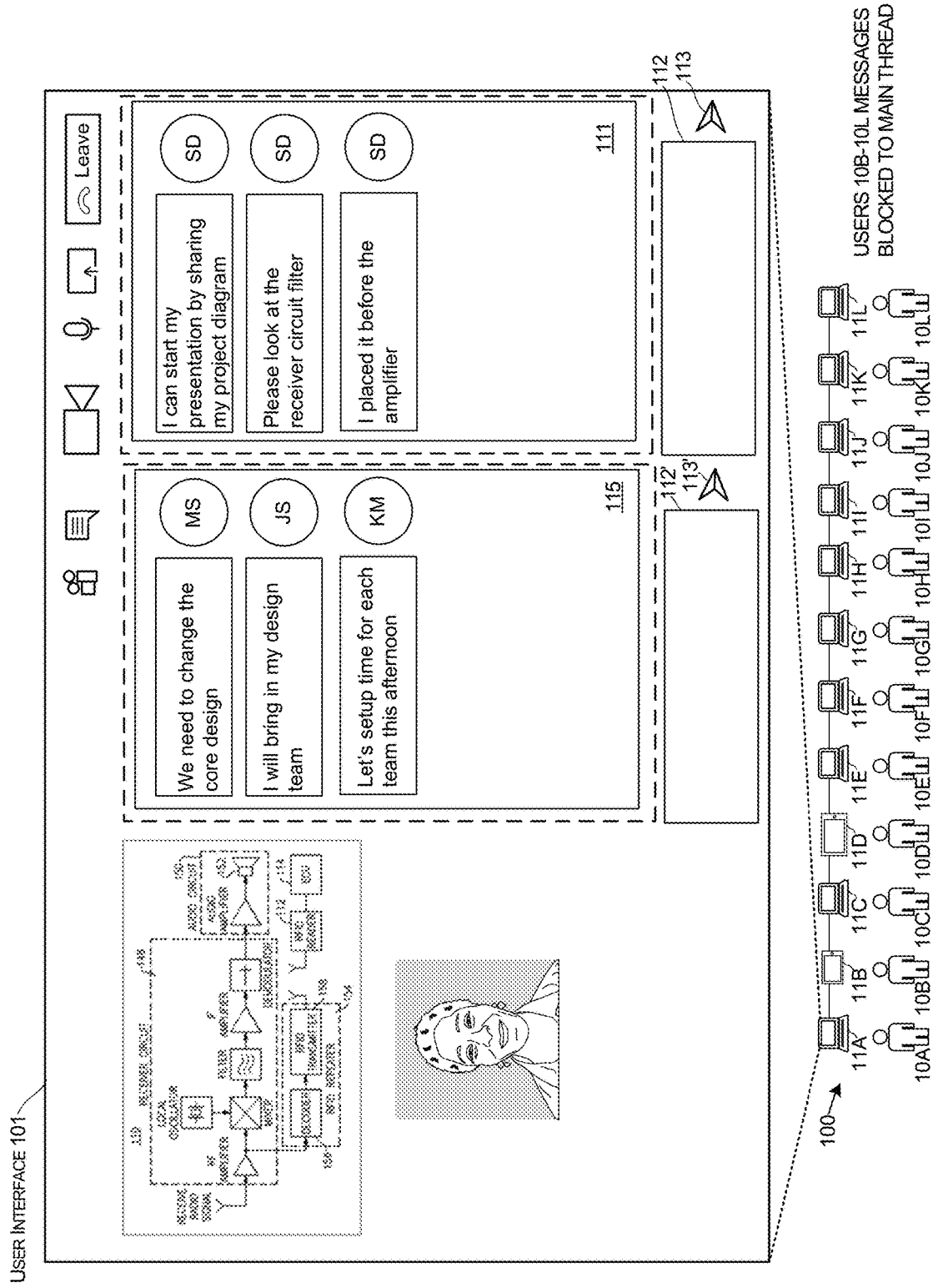

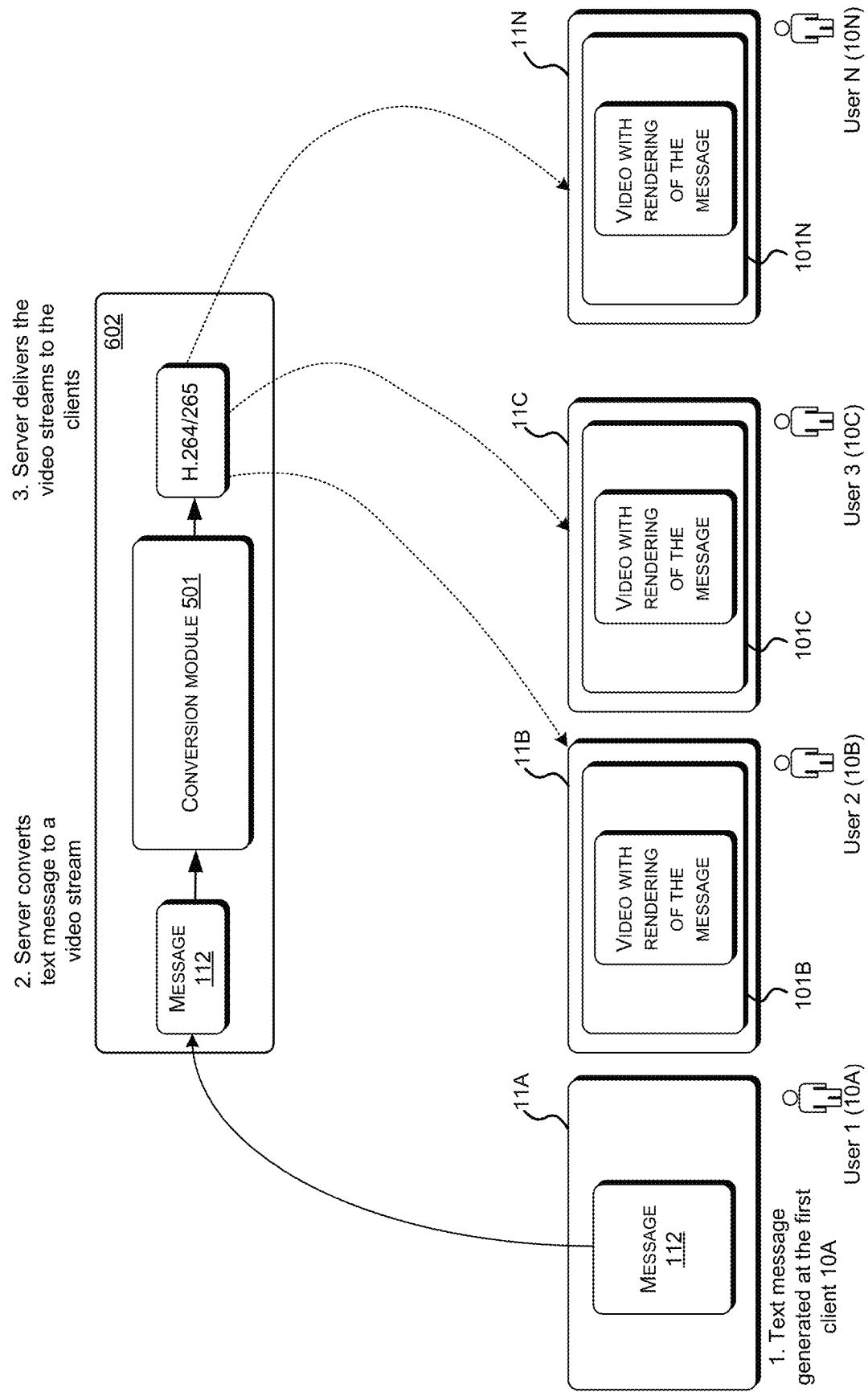

AUTOMATION OF PERMISSION CONTROLS FOR GROUP MESSAGES

BACKGROUND

Nearly half a billion people are deaf or hard of hearing. They are excluded from the hearing world because they cannot distinguish or identify sounds in their environment. The result is that they can miss out on experiencing the world in the same way that people with hearing do.

When it comes to communication programs, such as Zoom, Slack, Teams, Google Hangouts, or Facebook Messenger, some systems may not provide a complete user experience for people with even a small degree of hearing loss. For instance, some programs can process audio and video streams to allow meeting participants to talk and view one another. In addition, such systems can allow users to share text messages, which may be displayed in conjunction with renderings of the audio and video streams. Although the text messages and audio and video streams can be communicated in real time, such technologies may not provide the same experience for each user, particularly when some users are unable to speak or are deaf or hard of hearing.

In one illustrative example, consider a scenario where a group of users are participating in a meeting where video streams, audio streams, and text message are shared. When one of the users wants to take the floor, e.g., go into presentation mode, some systems may modify permissions to allow that user to talk. The system may also mute other users to allow that user to give a presentation without interruption from others. This feature set may be generally helpful for most users, but for users who are unable to speak, or are deaf or hard of hearing, existing systems that control audio and video streams may not provide an effective feature set that allows them to give a presentation. In some cases, users who are unable to speak, or deaf or hard of hearing may rely on a messaging user interface to provide their presentation. In that situation, when a user who is unable to speak wants to give a presentation, a system may allow others to flood the messaging user interface with messages. Such systems do not provide an effective communication forum for users who are unable to speak.

These shortcomings can lead to ineffective interactions between a computing device and a user. In addition, particularly in communication systems, the above-described shortcomings of existing systems can lead to inefficient communication of information and a loss in user engagement. Computing devices that do not promote user engagement, or worse, contribute to a loss of user engagement, can lead to production loss and inefficiencies with respect to a number computing resources. For instance, when a user becomes fatigued or disengaged, or when that user does not receive information in effective ways, that user may need to refer to other resources, such as documents or use other forms of communication, when shared content is missed or overlooked. Missed content may need to be re-sent when viewers miss salient points or cues during a live meeting. Such activities can lead to inefficient or duplicative use of a network, processor, memory, or other computing resources. Thus, there is an ongoing need to develop improvements to help make the user experience of communication systems more engaging and more like an in-person meeting. In addition, there is an ongoing need to develop improvements to help improve the accessibility features of communication systems.

SUMMARY

The techniques disclosed herein provide accessibility controls for group messages. To address some of the above-described issues and others, a system can support user accessibility by the use of a data structure that indicates that a user has accessibility needs with respect to providing a voice input. In some configurations, a system data structure, such as a Teams directory, can indicate when specific users have special needs. For instance, a Teams directory may indicate that a particular user has a designation as having limited ability to provide a voice input, limited ability for hearing audio signals, etc. A system can also receive an input control and access permission that allow a meeting coordinator or administrator to designate the user as a person with accessibility needs. The designation can be propagated to the Teams directory as a temporary designation for a predetermined time, such as the duration of a meeting call. Using the Teams directory, the system can allow that user to control other users access rights to providing messages to a message thread. When a user having the appropriate designation participates in a meeting having a particular role, e.g., a meeting presenter, the user can provide another input to lock the message thread so that only the user having the appropriate designation can provide messages to the thread and prevent all other users from providing messages to the message thread. The user can invoke a presenter role, by providing an input, such as a virtual hand raise. When the user's presentation is complete, the system can unlock the thread for the other users. The user can also unlock the thread for other users by providing a subsequent input, e.g., by lowering their virtual hand raise. By controlling a message thread in this manner, a system can allow a user having accessibility needs to participate in certain roles, such as a meeting presenter, using an existing message thread or a new message thread that exclusively allow that user to provide messages.

The thread locking mechanism can be accomplished in a number of ways. In some embodiments, the system can prevent a set of users from providing messages to a particular message thread when an individual user is designated as a presenter. In some configurations, the system can prevent the messages from being sent from the set of users when the system designates the individual user needing accessibility accommodations. The system can determine that the user needs accessibility accommodations by the user of a data structures such as a Teams directory. when the user having this designation indicates they are a presenter, the system can prevent others from providing messages to a particular thread. In some configurations, the system can prevent a set of users from providing messages by disabling text entry functionality at a user interface for each of the users of the set of users.

In another example, the system can prevent users from providing messages to a particular thread by receiving messages from the set of users and sending those messages to a supplemental thread. This allows presenters in need of accessibility accommodations to provide messages to a main presentation thread while still allowing others to communicate in the supplemental thread. When the user exits a presentation mode, e.g., the user lowers their virtual hand raise, the system can merge the messages of the supplemental thread with the main presentation thread. The supplemental thread can be in a separate user interface or at least graphically distinguished from the main presentation thread. These examples are provided for illustrative purposes and are not to be construed as limiting. It can be appreciated that other mechanisms for restricting the communication of messages from an audience based on the accessibility status of a presenter Kevin and can be implemented in other ways. It can also be appreciated that these techniques can be applied to a group chat even without video and audio and conferencing capabilities. Restricting communication of messages also includes inhibiting entry of the messages or preventing communication of the message by disabling a send button. Restricting communication of messages also includes inhibiting the display of messages at a receiving computer even if the message are received by the receiving computer.

The techniques disclosure in provide a number of technical benefits. For instance, by providing systems that automate visual indicators to show active speakers, particularly in a communication system, users can more effectively exchange information and gain a better understanding of the broader context of a meeting. Also, by viewing an actual video stream of an active speaker, instead of relying on a displayed avatar having a reduced size, users can readily benefit from viewing subtle gestures and body language. This helps mitigate occurrences where shared content is missed or overlooked. This can reduce occurrences where users need to re-send information. More effective communication of shared content can also help avoid the need for external systems, such as mobile phones for texting and other messaging platforms. This can help reduce the duplicative use of network, processor, memory, or other computing resources especially when prolonged meetings or additional meetings can be avoided.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 1A illustrates a first user interface arrangement showing a plurality of users contributing to a message thread.

FIG. 1B illustrates a first user interface arrangement showing a plurality of users contributing to a message thread and one user providing an input to invoke a state change of the system.

FIG. 3A illustrates a first user interface arrangement showing a plurality of users contributing to a message thread.

FIG. 3C illustrates a second user interface arrangement showing features for blocking a set of users from contributing to a first message thread while allowing the set of users to contribute to a secondary thread and allowing a presenter to contribute to the first message.

FIG. 3D illustrates another user interface arrangement showing features for merging messages of a first thread and a secondary thread upon completion of a user's presentation.

FIG. 5A illustrates a first user interface arrangement showing a plurality of users contributing to a message thread, this state is a first stage in an embodiment where a new thread is created for the first user to exclusively provide messages while others are able to write to the original thread.

FIG. 7A illustrates a first user interface arrangement showing a plurality of users participating in a communication session.

FIG. 7C illustrates a user interface arrangement showing a message thread that is superimposed over an image of a user allowed to exclusively provide messages to the message thread, wherein the user interface arrangement shows images of other users.

FIG. 7D illustrates a user interface arrangement showing a message thread that replaces an image of a user who is allowed to exclusively provide messages to the message thread.

FIG. 7E illustrates a user interface arrangement showing a message thread that is superimposed over an image of a user who is allowed to exclusively provide messages to the message thread.

FIG. 7G illustrates a user interface arrangement displayed from the perspective of a user who is allowed to exclusively contribute to a message thread during a second operating mode that restricts other users from contributing to the message thread.

FIG. 7H illustrates a user interface arrangement displayed from the perspective of a user who is allowed to exclusively contribute to a first message thread during a second operating mode that restricts other users from contributing to the first message thread, and a display of a second message thread that accepts and displays messages from other users.

FIG. 8 illustrates aspects of a process for displaying messages within a communication session user interface.

DETAILED DESCRIPTION

Figure 1C:
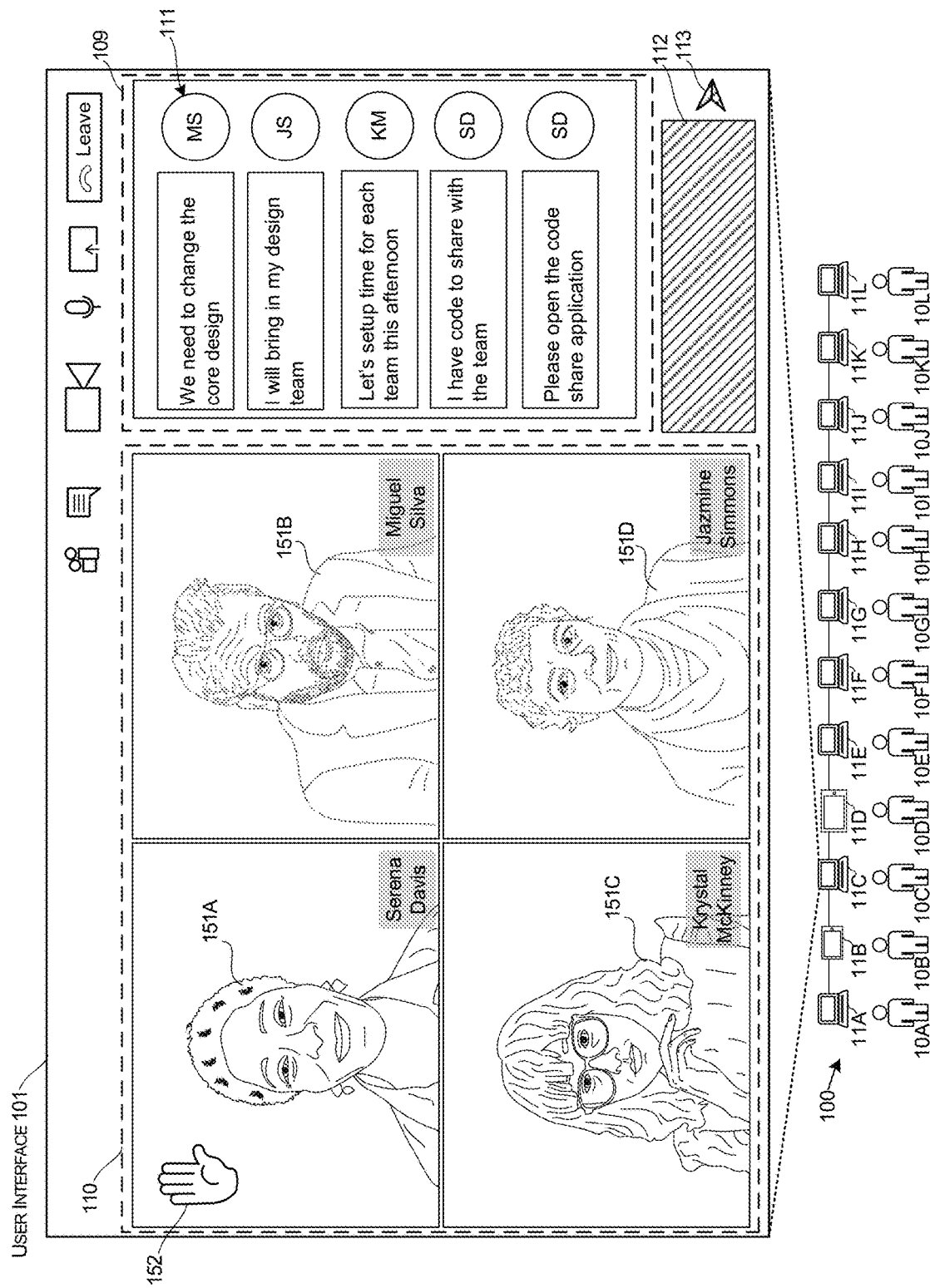
FIG. 1C illustrates a second user interface arrangement showing features for blocking a set of users from contributing to a message thread while allowing a presenter to contribute to the message thread.

FIGS. 1A-1C illustrate an example of a scenario where a system allows a user to control permissions for a message thread of other users. In this example, a number of people are participating in a communication session, which involves the communication of text messages via a message thread and the communication of audio and video streams. The communication session can be managed by a system 100 comprising a number of computers 11 each corresponding to a number of users 10. The techniques disclosed herein can operate on a single device, or operate on a computing platform that utilizes a combination of computers, the servers described herein.

In this example, the First User 10A, Serena Davis, is associated with the first computer 11A, the Second User 10B, Miguel Silva, is associated with the second computer 11B, the Third User 10C, Krystal McKinney, is associated with the third computer 11C, the Fourth User 10D, Jazmine Simmons, is associated with the fourth computer 11D, the Fifth User 10E, James Smith, is associated with the fifth computer 11E, the Sixth User 10F, Traci Isaac, is associated with the sixth computer 11F, the Seventh User 10G, MJ Price, is associated with the seventh computer 11G, the Eighth User 10H, Jessica Kline, is associated with the eighth computer 11H, the Ninth User 10I, Kat Larsson, is associated with the ninth computer 11I, and the tenth User 10J, Stella Jones, is associated with the tenth computer 11J, the eleventh User 10K, Tim Johnson, and the twelfth User 10L, Brett Michael, is associated with the twelfth computer 11L. These users can also be respectively referred to as "User A," "User B," "User C," etc. Each user can be displayed in a user interface as a two-dimensional (2D) image 151. The 2D image 151 can be a static image or a video stream generated by a camera directed to a user. The users can also communicate using live audio streams. The computers can be in the form of desktop computers, head-mounted display units, tablets, mobile phones, etc.

The system can generate a user interface showing aspects of the communication session to each user participating in a communication session. In this example, a user interface arrangement 101 is initially displayed as having renderings of users with a message thread 111 having individual messages 112. The message thread 111 in a message region 109 can be displayed concurrently with a video region 110 having the images of the users.

In a first operating mode, each of the computers for each user can contribute messages to the message thread 111. In a second operating mode, a select computer, e.g., a user having appropriate permissions, can contribute messages to the message thread 111 while also having the control to restrict other computing devices from contributing messages to the message thread. In some configurations, the system can operate using the first operating mode. This operating mode can also cause a first user interface arrangement as shown in FIG. 1A. In this particular example, the example user interface can be displayed on the device of a set of users, e.g., User B through User L using devices 11B-11L.

During an event, such as an online meeting, a user, such as the first user 10A, can provide an input to change the state of the meeting or change the operating state of the system. In one illustrative example, the input can be in the form of a keyboard entry, a voice command, a gesture captured by a camera or any other suitable input. In a specific example, the input can be a gesture performed by a user such as a hand raise. When the system detects that the person has raised their hand by a predetermined distance, the system can determine that as a valid input to invoke a state change in a system or invoke an interruption in an event. In some kind of federations, a hand raised input can invoke accessibility features. Invocation accessibility features can involve a system transition from a first class of operations using a first set of permissions to a second class of operations using a second sets of permissions. In some configurations, and input can be referred to herein as a qualifying input. A qualifying input can be any input that includes a predetermined gesture, such as a hand raised, or an input that involves a predetermined key entry, etc.

In the example of FIG. 1B, in response to an input, such as a hand raise gesture performed by a user, the system can generate a graphical element 152 confirming receipt of the input. This graphical element can notify other users 10B-10L that the first user 10A intends to share information, e.g., give a presentation. In one illustrative example, the system can receive an input associated with a user 10A, also referred to herein as a qualifying input. The input is received for initiating an operating state change of the system 100. The system can be configured to cause the system 100 to transition from a first class of operations 788 to a second class of operations 789, where the first class of operations 788 allowing a plurality of computing devices 11A-10L associated with a plurality of users 10A-10L to contribute messages 112 to the message thread 111. The second class of operations 789 allow the computing device 11A of the user 10A to contribute messages 112 to the message thread 111 while restricting other computing devices 11B-11L of other users 10B-10L from contributing messages 112 to the message thread 111.

In response to the input for initiating the operating state change, the system can analyze permissions data to determine that the user 10A associated with the input is designated to invoke the operating state change of the system 100 from the first class of operations to the second class of operations that allow the computing device 11A of the user 10A to contribute messages 112 to the message thread 111 while restricting other computing devices 11B-11L of other users 10B-10L from contributing messages 112 to the message thread 111.

In response to determining that the permissions data indicates that the user 10A associated with the input is designated to invoke the operating state change of the system 100 from utilization of the first class of operations 788 to utilization of the second class of operations, the system can invoke the operating state change of the system 100 from utilization of the first class of operations to the utilization of the second class of operations, wherein the first class of operations 788 allows the plurality of computing devices 11A-10L associated with the plurality of users 10A-10L to contribute messages 112 to the message thread 111, and wherein the second class of operations 789 allows the computing device 11A of the user 10A to contribute messages 112 to the message thread 111 while restricting other computing devices 11B-11L of other users 10B-10L from contributing messages 112 to the message thread 111.

As shown in FIG. 1C, one way to restrict other computing devices 11B-11L of other users 10B-10L from contributing messages 112 to the message thread 111 is to block the computing devices 11B-11L from sending the message. This can be done internally with permissions being sent to the clients. In addition, or alternatively, one or more computers can disable at least one of a text entry field 112 or a send button 113 of a user interface displayed on the other computing devices 11B-11L. The text entry field or the send button of the user interface can remain disabled until a second input is received from the user 10A, where the second input can be configure to initiate a second operating state change from the utilization of the second class of operations to the utilization of the first class of operations.

Figure 2A:
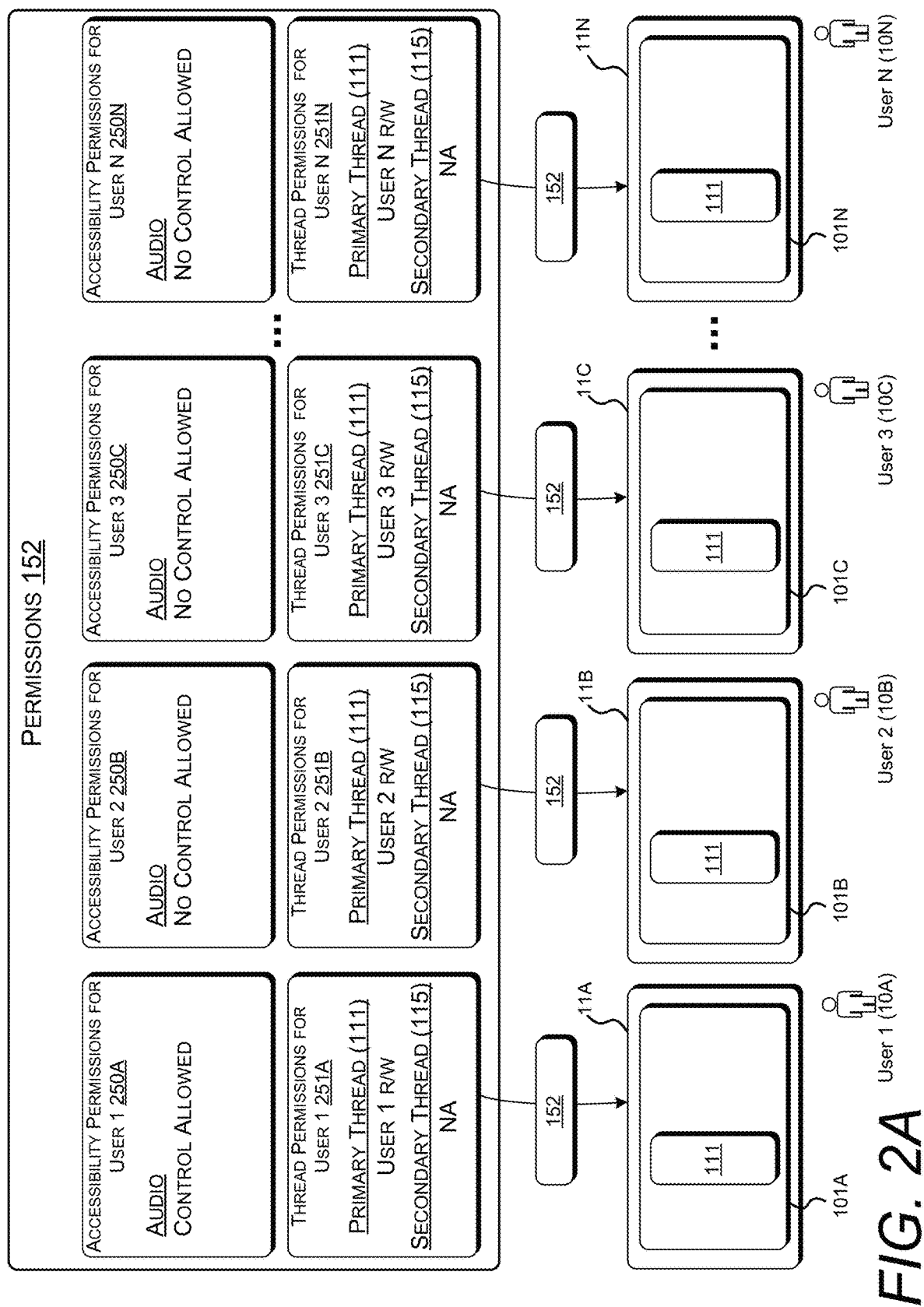
FIG. 2A illustrates a set of permissions that allows the first user to control message thread access for a set of users.
Figure 2B:
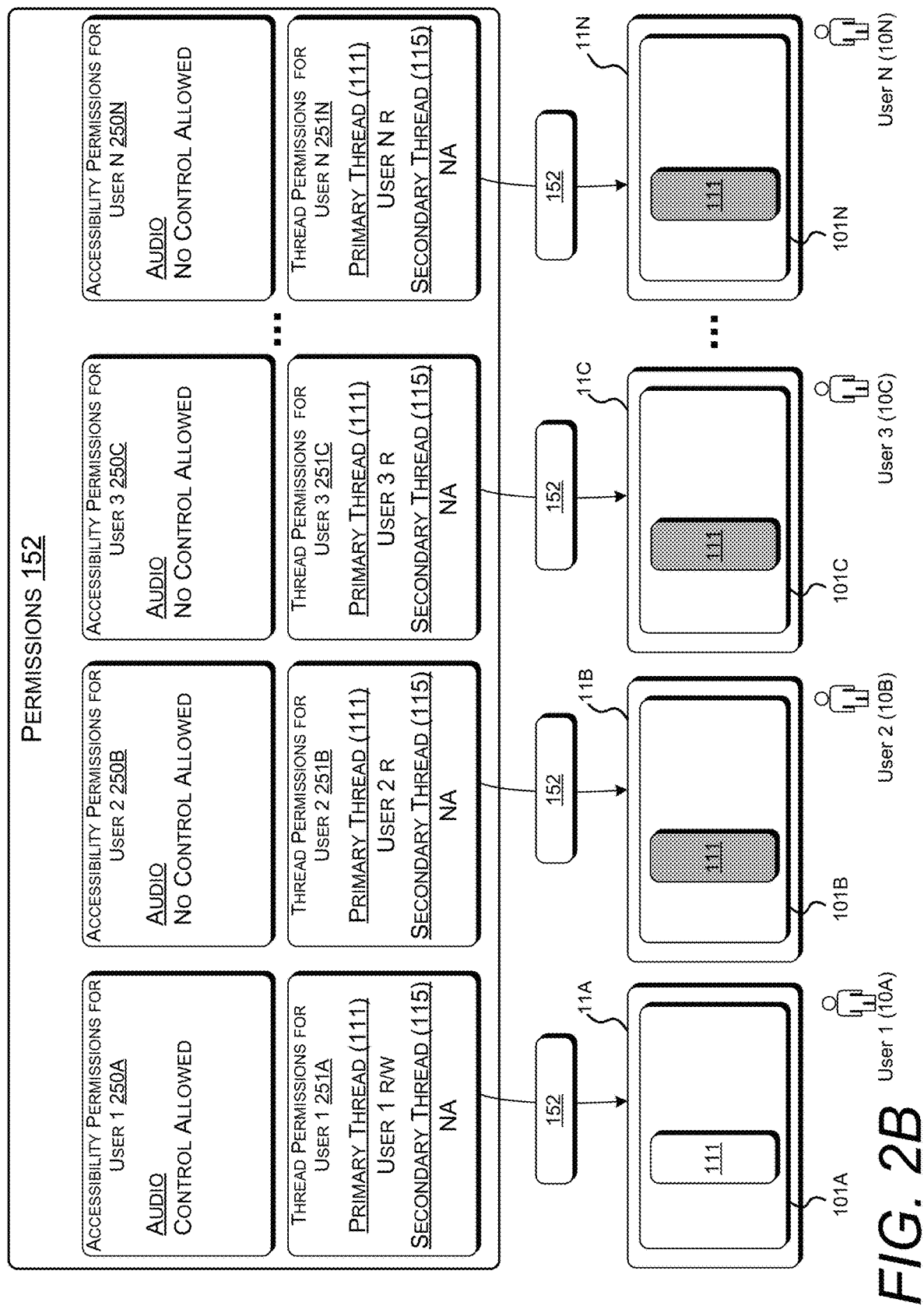
FIG. 2B illustrates a set of permissions that allows the first user to control message thread access for a set of users and a second set of permissions that prevents the set of users from contributing messages to a message thread.
Figure 2C:
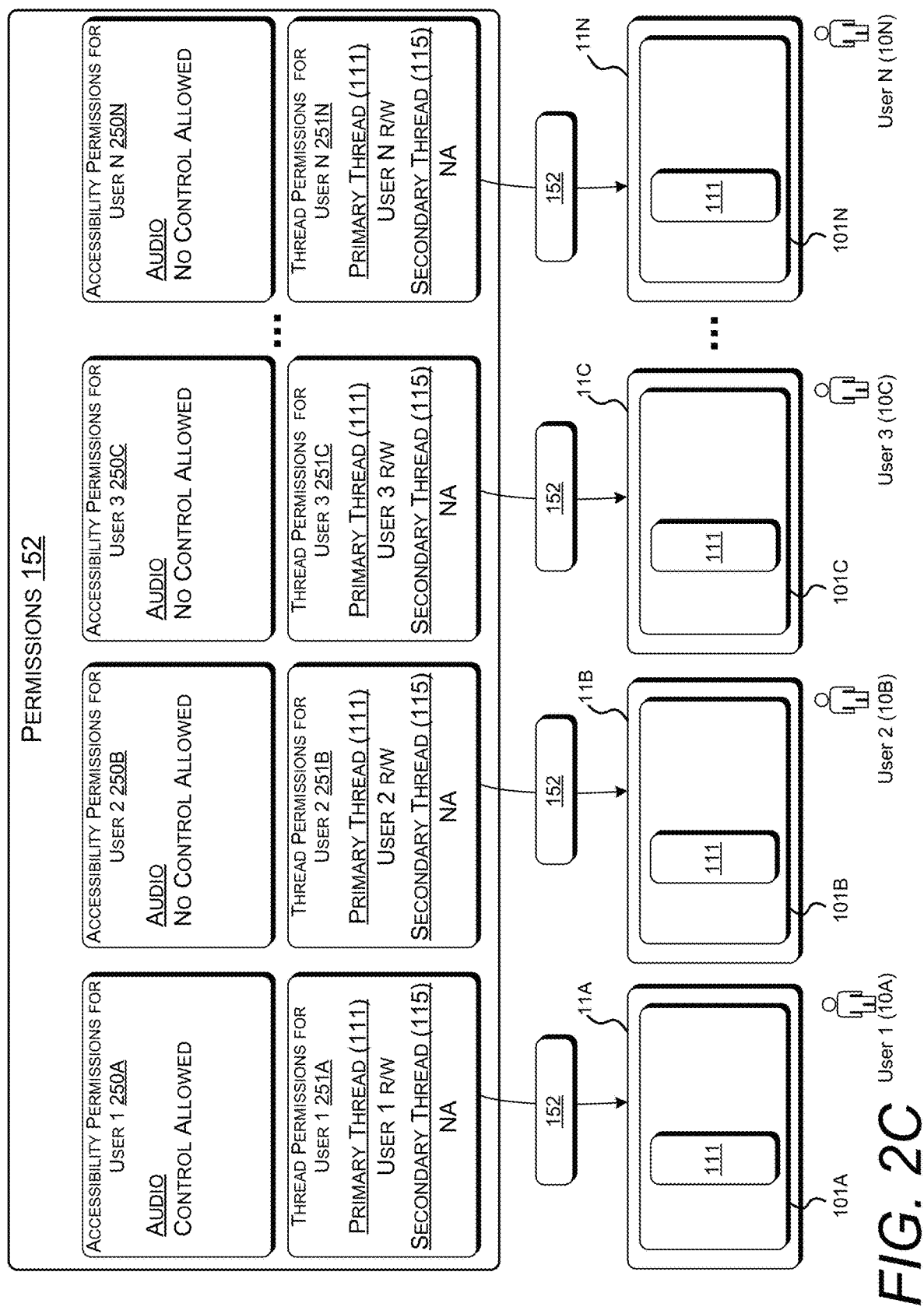
FIG. 2C illustrates a set of permissions that allows the first user to control message thread access for a set of users and a second set of permissions that allows the set of users to contribute messages to a message thread.

Referring now to FIGS. 2A-2C, a set of permissions 152 is shown. In the example of FIG. 2A, each user, up to N users, has a first set of accessibility permissions 250 and the second set of thread permissions 251. The first set of accessibility permissions allow users to control the thread permissions of other users. For instance, the first user has accessibility permissions that allows the first user 10A to control the thread permissions 251 for other users. While at the same time, the other users 10B-10N, do not have the ability to control the thread permissions of others. In this first state of the permissions come up each user has the ability to read and write to the primary thread 111. Also in this example, any portion of the permissions 152 can be communicated to the individual client computing device 11, to allow each of the computers to follow the permissions as they are modified throughout the process.

Thus, in response to a qualifying input from the first user, the system can analyze the permissions 152 and determined that the first user is designated as having ability to control the operating state of the system, which also means they have the ability to change the thread permissions of other users. In this case, the example shows that the first user has an accessibility with respect to audio, e.g., they may have an impairment with respect to the ability to speak or an impairment with respect to the ability to hear. When such needs are present, even temporarily, the system can analyze these permissions to determine if an impairment exists and react accordingly. In this example, the system can determine that the user is unable to speak and in such a case cannot provide an audio stream of a presentation. In this scenario, the system can allow the user to provide a presentation using a chat thread that is not to be interrupted by messages sent from other users.

FIG. 2B illustrates a modification in the permissions in response to the first user providing a input indicating that they would like to give a presentation. Since this user has permissions to control the operating state of the system, e.g., the accessibility permissions indicate the first user has "allowed" control permission, The system responds to the input by changing the thread permissions for the other users, User B through User N, to restrict those other users from writing to the primary thread 111. In this example, those other users have the ability to read the messages of the primary thread. In this example, the first user also retains the ability to read and write to the primary thread.

As shown in FIG. 2C, once the first user 10A is done with their presentation or they provide a second input indicating completion of a presentation, the systems can change the permissions back to the original state where the other users are allowed to contribute messages to the primary thread 111. This transition back to the original state can occur in response to a number of different events. For instance, the presentation mode of the first user may only last for a predetermined period of time, and in conclusion of that period of time the system may revert the permissions back to the original state. The system can also determine when a user has completed a presentation. For instance, if the first user stops providing text messages for a predetermined period of time, the system may determine that the user has completed their presentation and may referred the permissions back to the original state as shown in FIG. 2C.

Figure 3B:
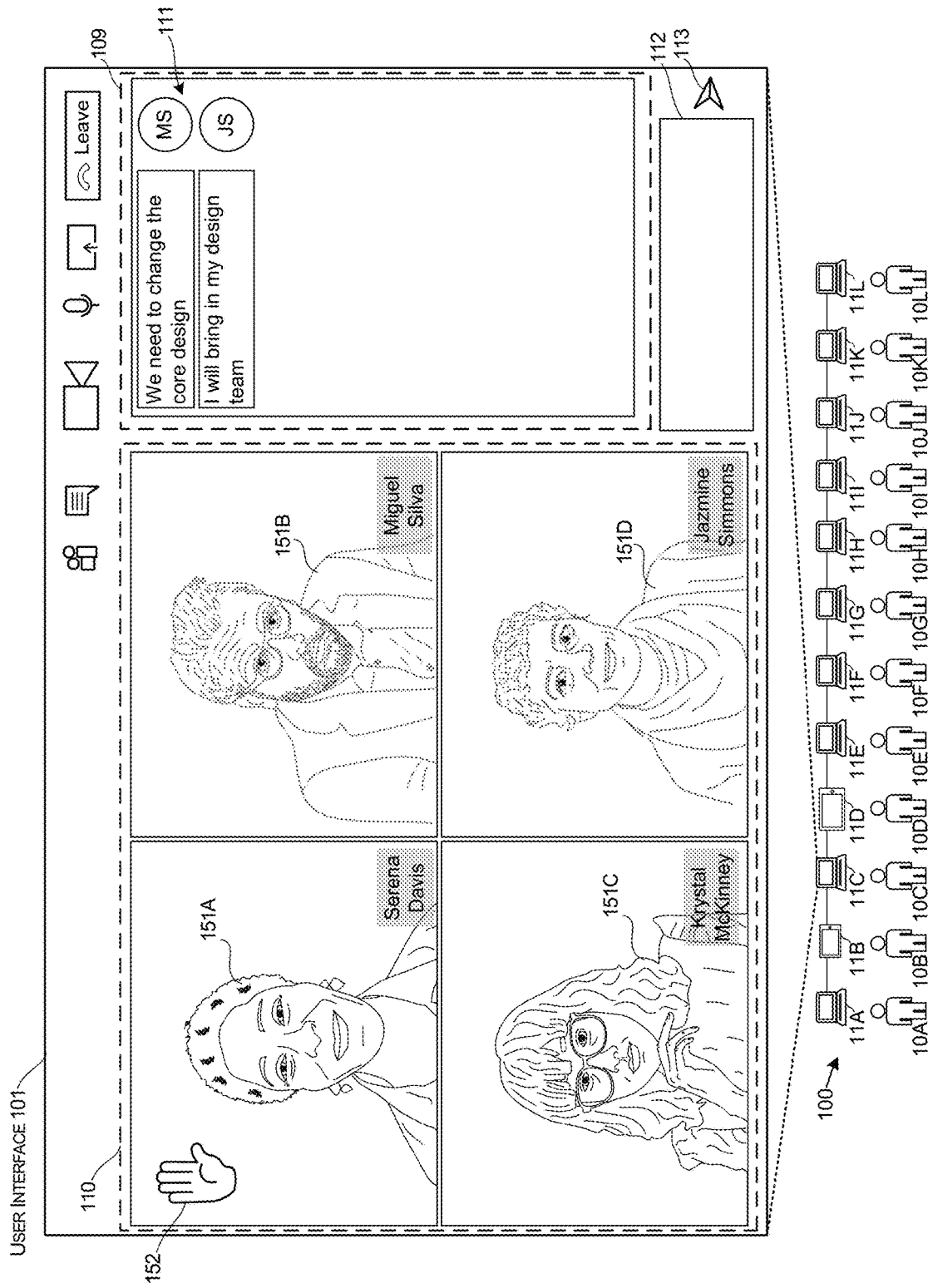
FIG. 3B illustrates a first user interface arrangement showing a plurality of users contributing to a message thread and one user providing an input to invoke a state change of the system.

FIGS. 3A-3D illustrate another embodiment where a first user can restrict other users from contributing to a primary thread and also allow those other users to contribute to a secondary thread. As shown in FIG. 3A, the system provides a user interface illustrating renderings of a plurality of users, a message thread 111, an input text field 112, and a text send button 113. As shown in FIG. 3B, the first user provides a qualifying input and the system generates a graphical element 152 to indicate receipt of that input. In FIG. 3C, in response to the qualifying input, the system can generate a second message thread 115 that is reserved for messages of the other devices 11B-11L of the other users 10B-10L. The second message thread 115 may also have a corresponding input text box 112' and a send button 113'. The second message thread 115 may also be displayed in a second message region 115'.

In the first operating state of the system, shown in FIG. 3A, each of the users can provide messages to the primary thread 111. However, since the first user qualifies as a user who can change the operating state of the system, this system can change to a second operating state in response to their predetermined input, e.g. a hand raise. Once in the second operating state, the other devices 11B-11L of the other users 10B-10L are restricted from contributing messages to the primary thread 111, while the first device 11A of the first user 10A is allowed to provide messages to the primary thread 111. In the second operating state, the other devices 11B-11L of the other users 10B-10L are allowed to provide message to the second thread 115.

Once the user 10A has completed their presentation, as shown in FIG. 3D, the system can revert back to the first operating state and allow the other devices 11B-11L of the other users 10B-10L to contribute to the primary thread 111. In addition, the system can merge the messages of both the first thread and the second thread shown in FIG. 3D.

Figure 4A:
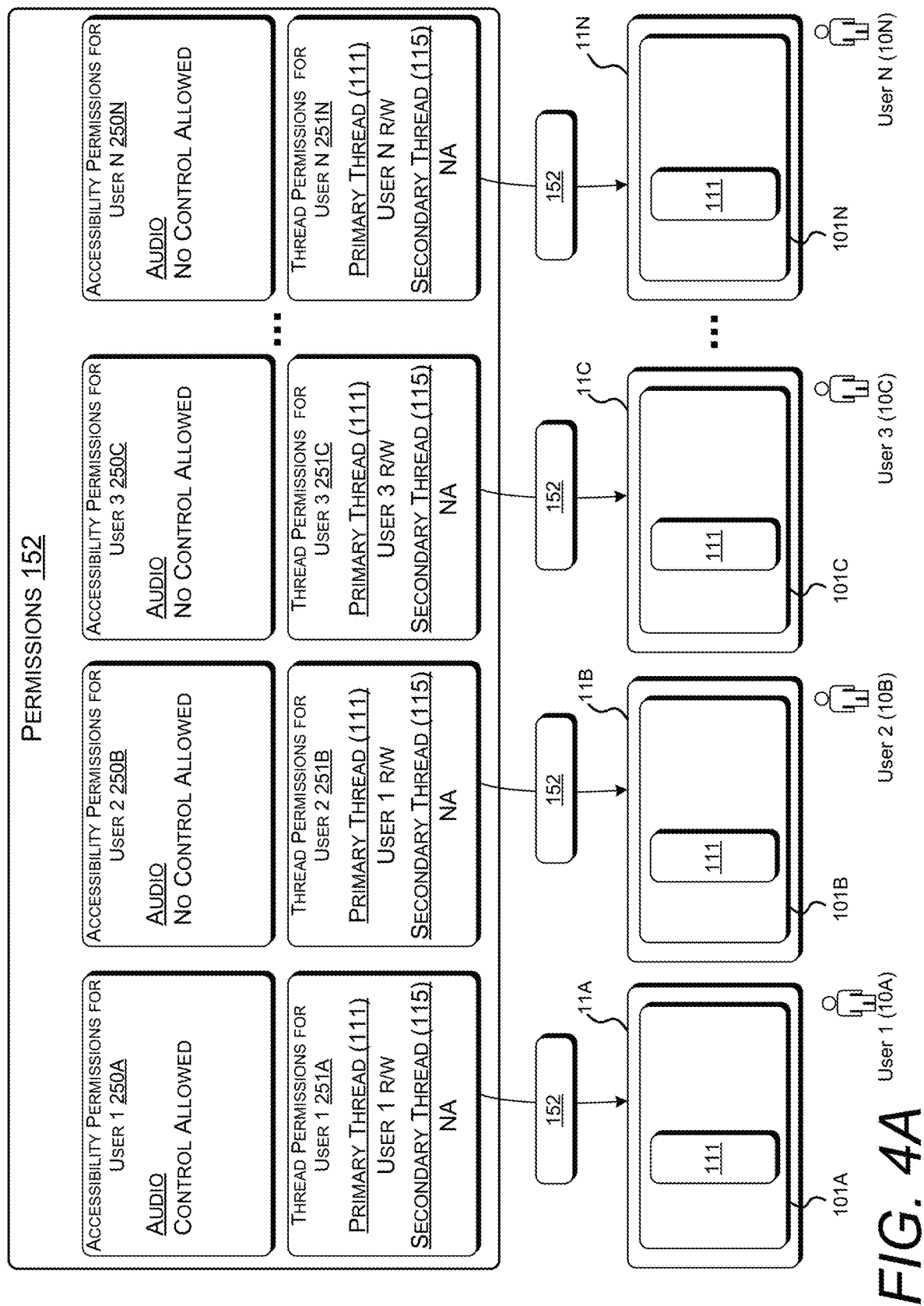
FIG. 4A illustrates a set of permissions that allows the first user to control message thread access for a set of users.
Figure 4B:
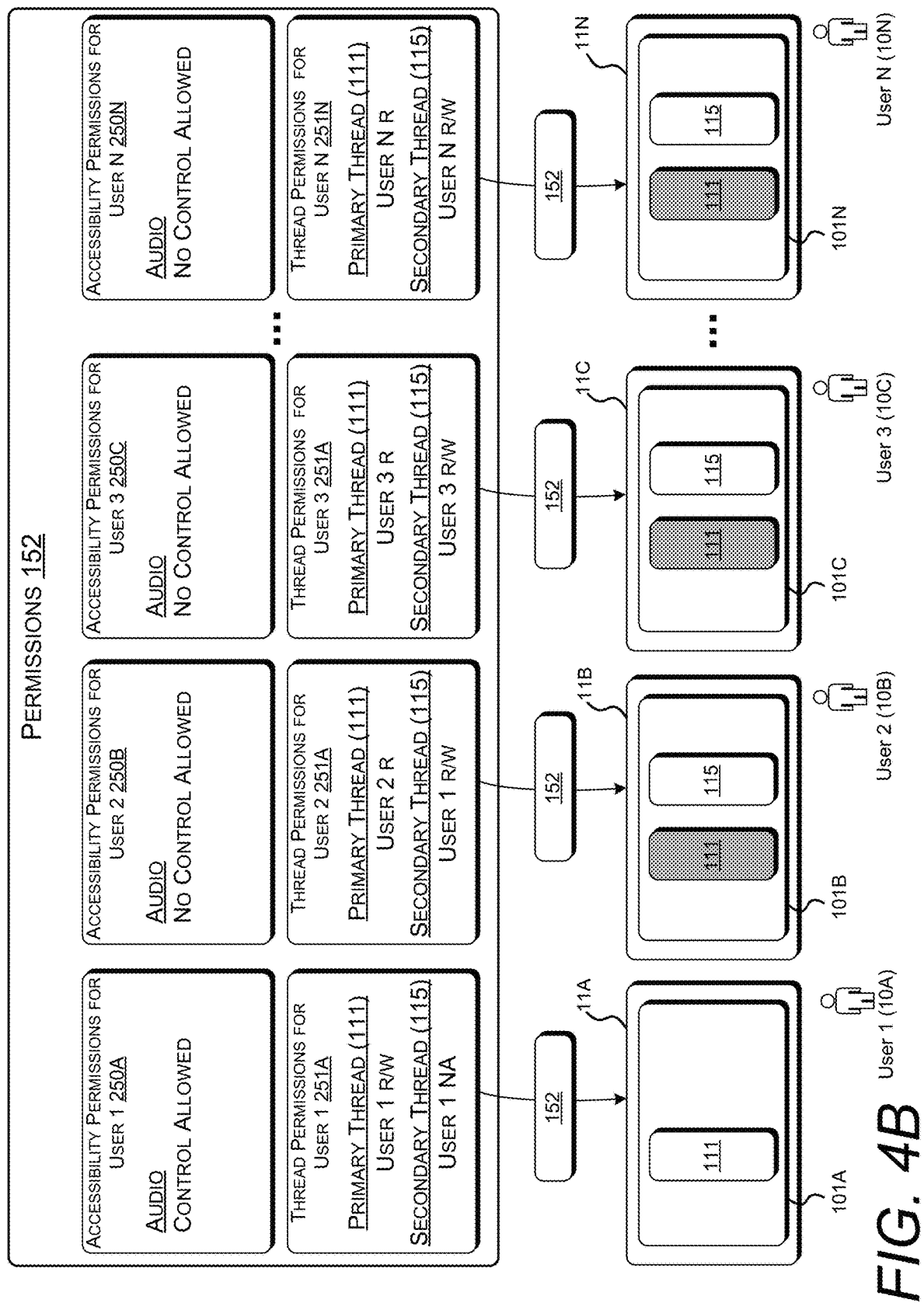
FIG. 4B illustrates a first set of permissions that allows the first user to control message thread access for a set of users and a second set of permissions that prevents the set of users from contributing messages to a first message thread, and a third set of permissions that allows the set of users to contribute to a second message thread.
Figure 4C:
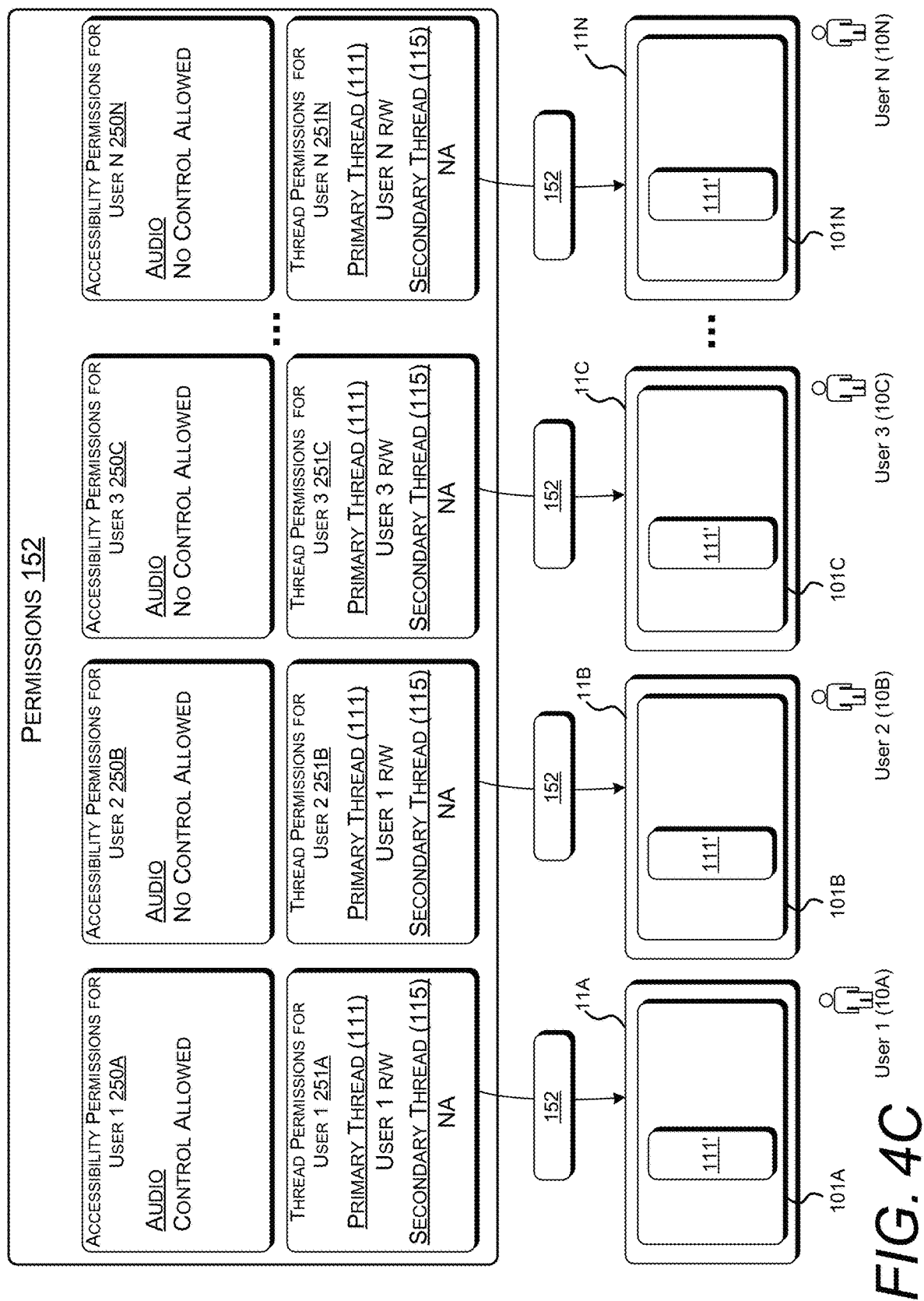
FIG. 4C illustrates a set of permissions that allows a system to merge messages from two separate message threads to a single updated thread upon completion of a presentation from a user.

FIGS. 4A-4C show the changes of the permissions throughout the process described above with respect to FIG. 3A-3D. In this case, as shown in FIG. 4A, the first user has the ability to invoke the operating state change of the system. The other users do not have the appropriate accessibility permissions to change the operating state of the system. In this state of the permissions, each user has the ability to read and write to the primary thread 111. A shown in FIG. 4B, in response to the first user providing an input to change the operating state of the system, the system can modify the thread permissions of the other users 10B-10N, and restrict those users from being able to contribute to the primary thread but at the same time give those users the right to contribute messages to the secondary thread 115. In this state of the permissions, the first user is the only user that can write messages to the primary thread. Once the user has completed their presentation, as shown in FIG. 4C, the system can change the state of the thread permissions back to their original state and allow all users to contribute to the primary thread. In addition, the system can merge the primary thread and the secondary thread into a new thread 111' which can also be displayed to all users.

Although the above-described examples illustrate examples where a thread is used by all users of a communication session and then modified during a presentation to only allow one user to contribute messages to that thread, the system can use other UI arrangements to allow a presenter to use a message thread for a presentation. For example, during a first mode of operation, a system may start a communication session, such as an online meeting, using a first thread. In this first mode of operation, the system may allow all users of the session to contribute messages to the first thread. Then during a presentation provided by a first user, e.g., during a second mode of operation, the system may allow the other users to continue using the primary thread but then create a second thread that may be exclusively used by the first user who has appropriate accessibility permissions to create a new thread. This allows the first user to provide a presentation using a message thread that is not interrupted by the messages of other users. The accessibility permissions, e.g., users having allowed controls, only allow certain users to create a separate thread for a presentation. This prevents a situation where the system isn't inundated with a large number of threads, which can cause confusion and inefficiencies with respect to computing resources. An example of this embodiment is shown in FIGS. 5A-5D and 6A-6C.

Figure 5B:
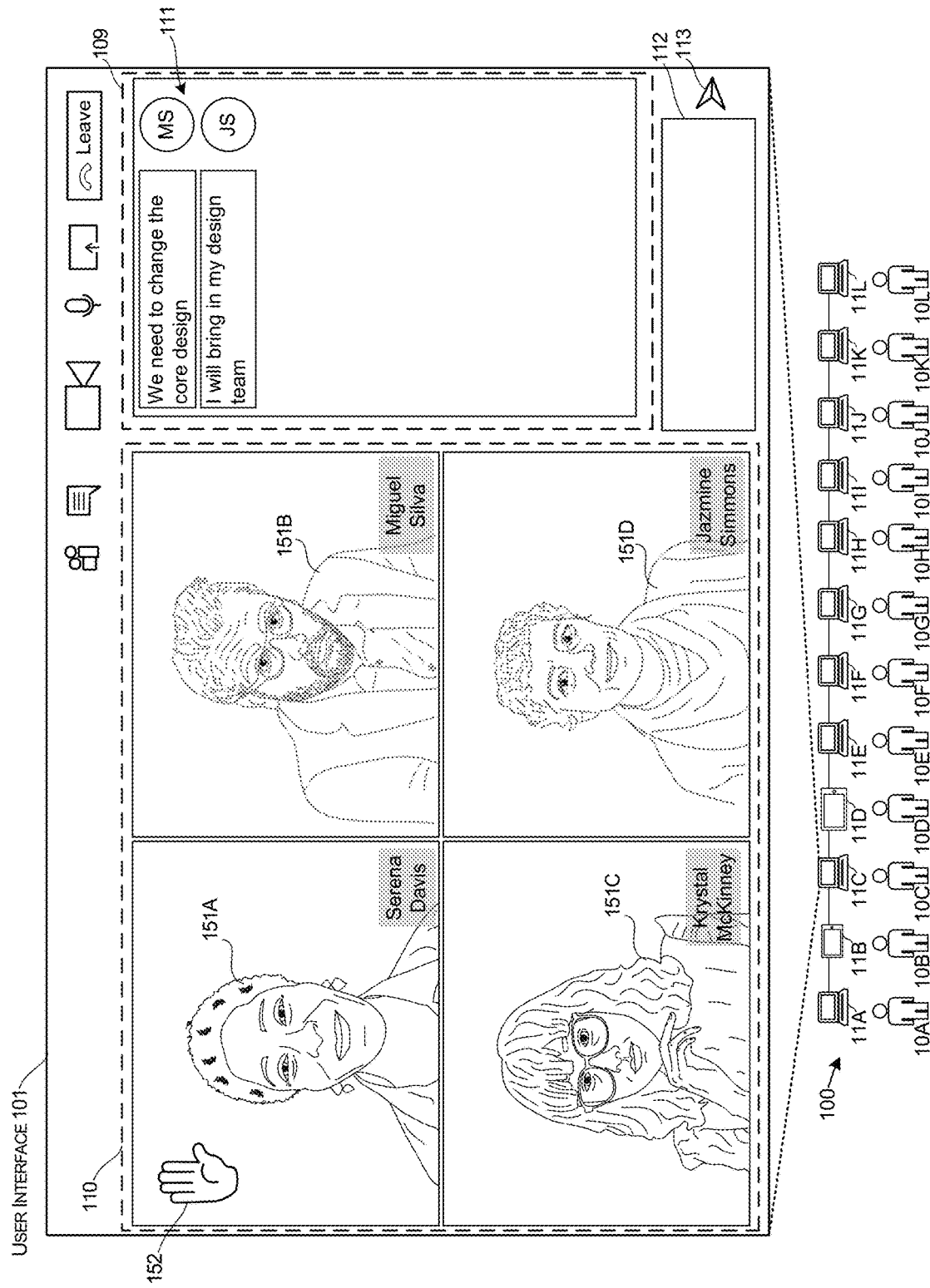
FIG. 5B illustrates a first user interface arrangement showing a plurality of users contributing to a message thread and one user providing an input to invoke a state change of the system.
Figure 5C:
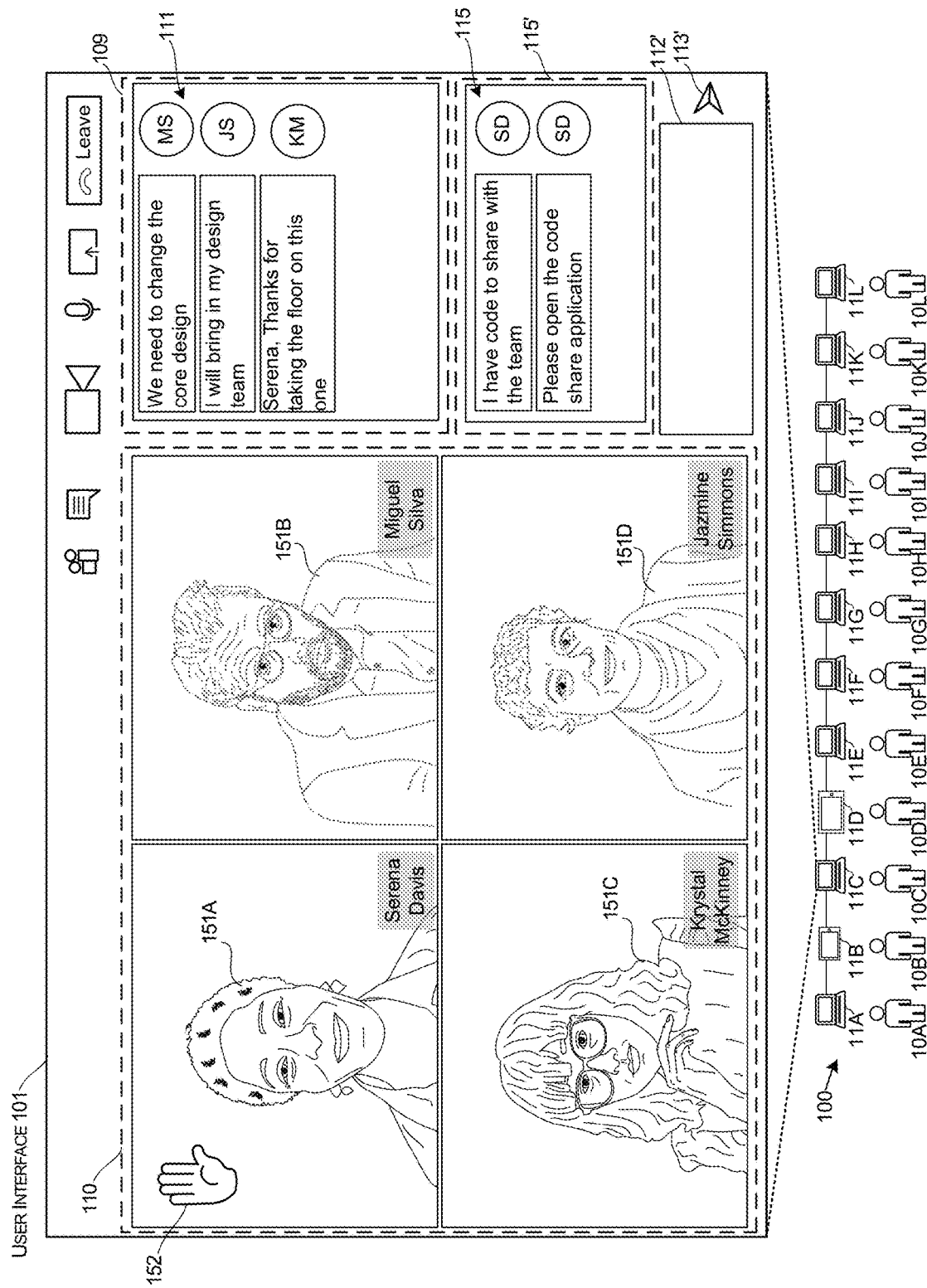
FIG. 5C illustrates a second user interface arrangement showing features for blocking a set of users from contributing to a new message thread while allowing the set of users to contribute to an original thread and allowing a presenter to contribute to the new message thread.

FIGS. 5A-5D illustrate another embodiment where a first user can restrict other users from contributing to a new thread 115, also referred to herein as a secondary thread 115, and also allow those other users to contribute to the original thread 111, also referred to herein as a primary thread 111. As shown in FIG. 5A, the system provides a user interface illustrating renderings of a plurality of users, an original message thread 111, an input text field 112, and a text send button 113. As shown in FIG. 5B, the first user provides a qualifying input and the system generates a graphical element 152 to indicate receipt of that input. In FIG. 5C, in response to the qualifying input, the system can generate a new message thread 115 that is reserved for messages of the device 11A of the first users 10A, while the original thread is reserved for other devices 11B-11L of the other users 10B-10L. The new message thread 115 may also have a corresponding input text box 112' and a send button 113'.

In the first operating state of the system, shown in FIG. 5A, each of the users can provide messages to the primary thread 111. However, since the first user qualifies as a user who can change the operating state of the system, this system can change to a second operating state in response to their predetermined input, e.g., a hand raise. Once in the second operating state, the other devices 11B-11L of the other users 10B-10L are restricted from contributing messages to the new thread 115, while the first device 11A of the first user 10A is allowed to exclusively provide messages to the new thread 115. In the second operating state, the other devices 11B-11L of the other users 10B-10L are allowed to provide message to the original thread 111.

Figure 5D:
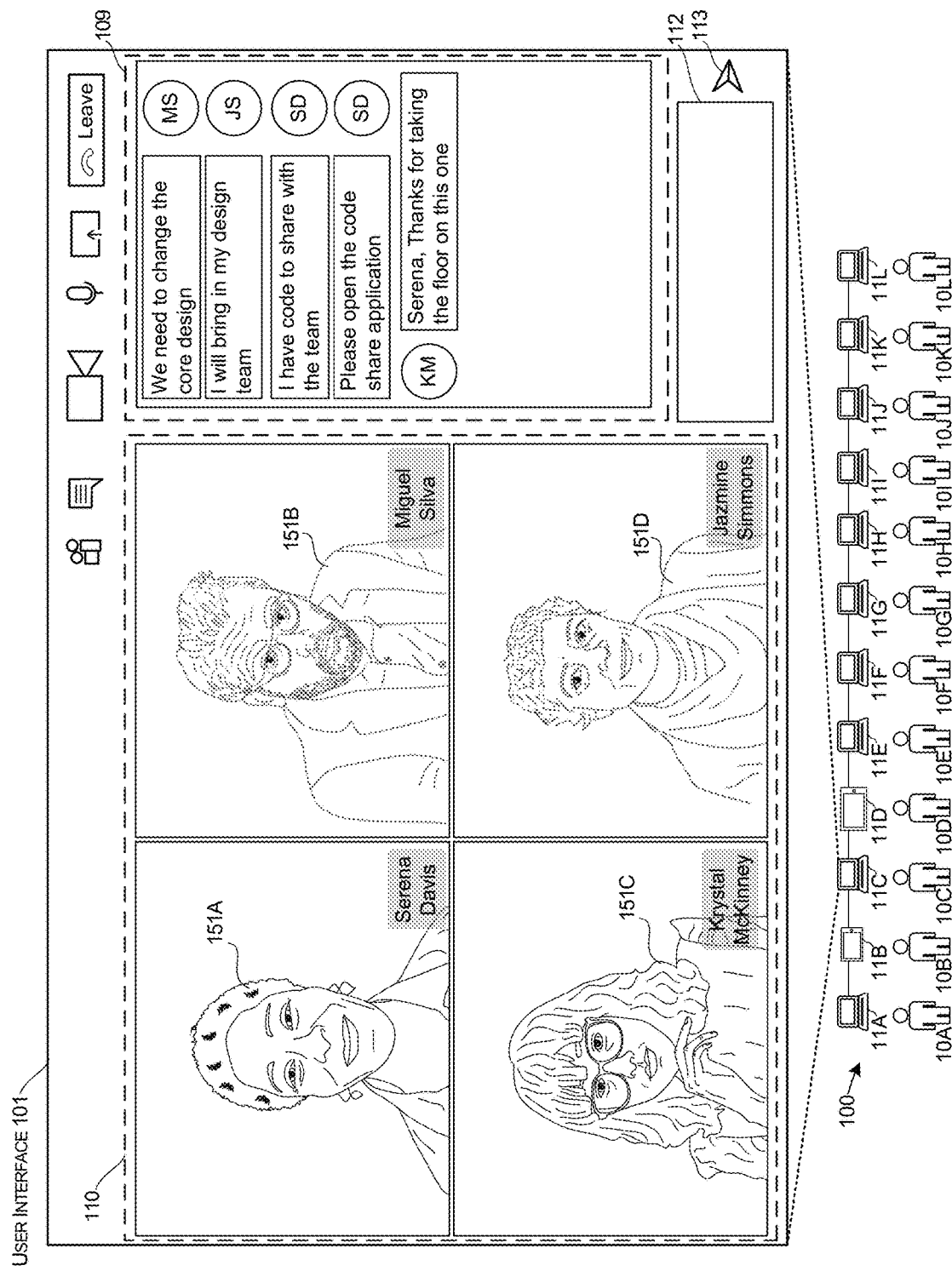
FIG. 5D illustrates another user interface arrangement showing features for merging messages of the new thread and the original thread upon completion of a user's presentation.

Once the user 10A has completed their presentation, as shown in FIG. 5D, the system can revert back to the first operating state where the system only shows the original thread 111. In addition, the system can merge the messages of both the new thread and the original thread shown in FIG. 5D.

Figure 6A:
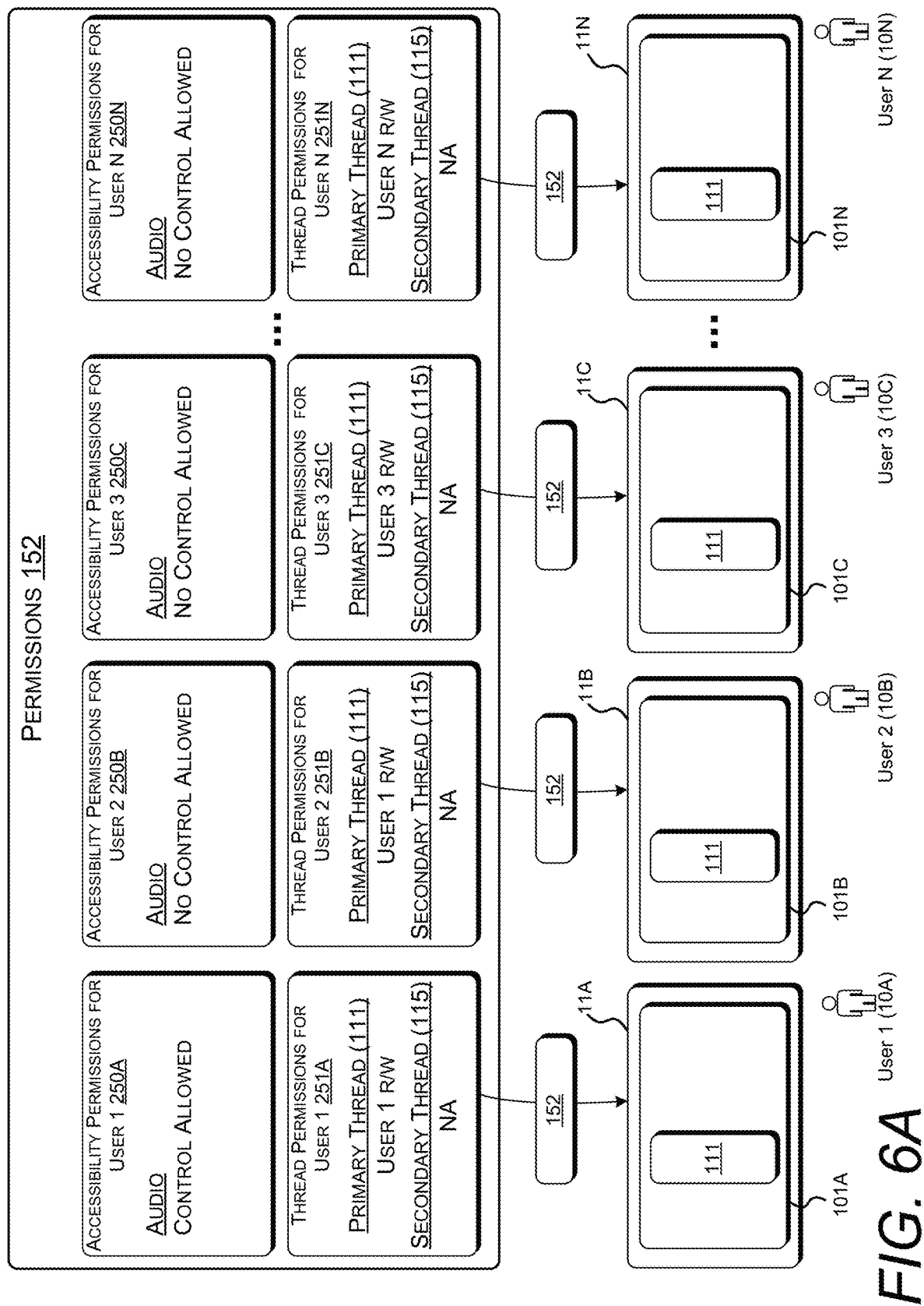
FIG. 6A illustrates a set of permissions that allows the first user to control message thread access for a set of users.
Figure 6B:
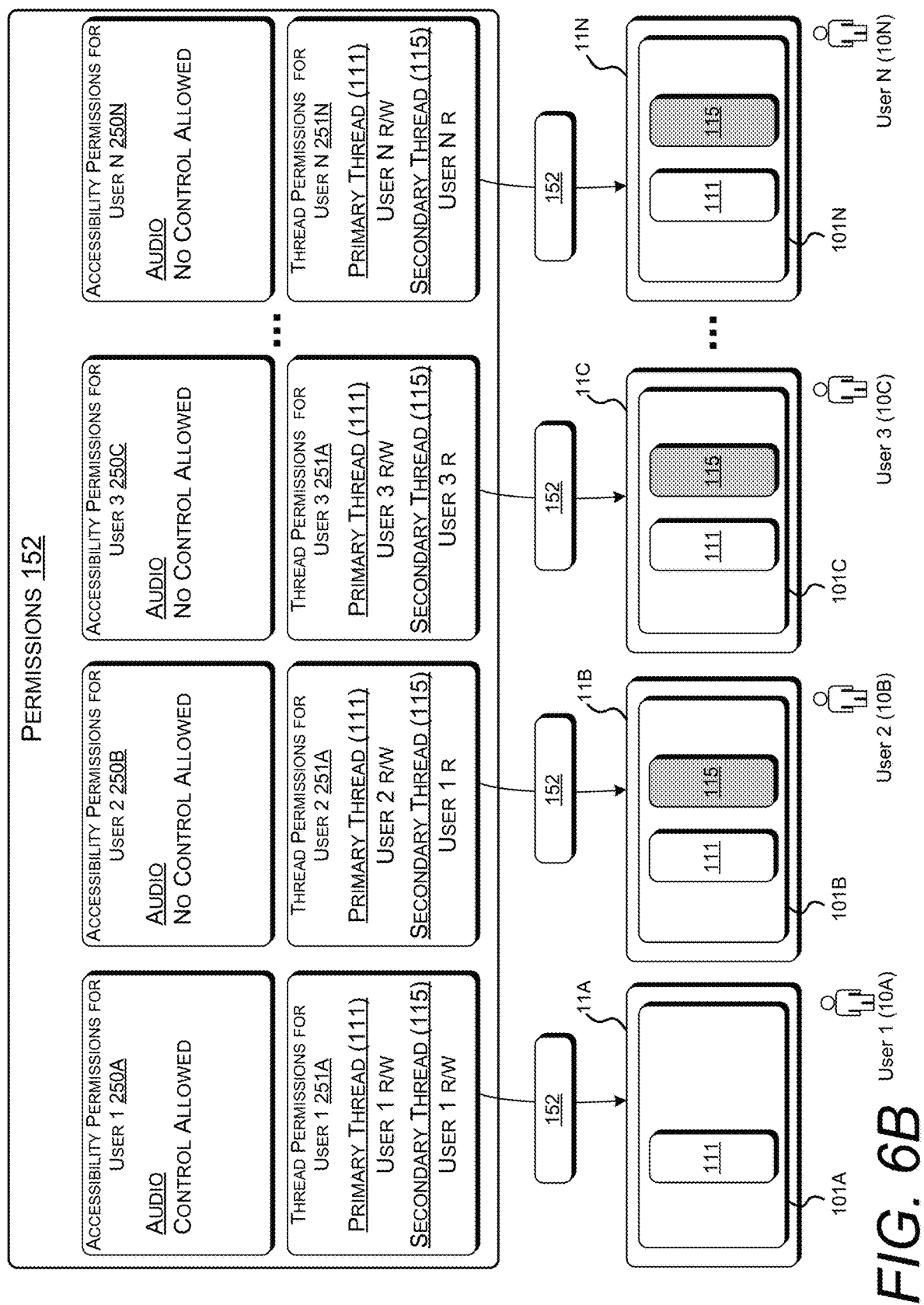
FIG. 6B illustrates a first set of permissions that allows the first user to control message thread access for a set of users and a second set of permissions that prevents the set of users from contributing messages to a new message thread, and a third set of permissions that allows the set of users to contribute to an original message thread.
Figure 6C:
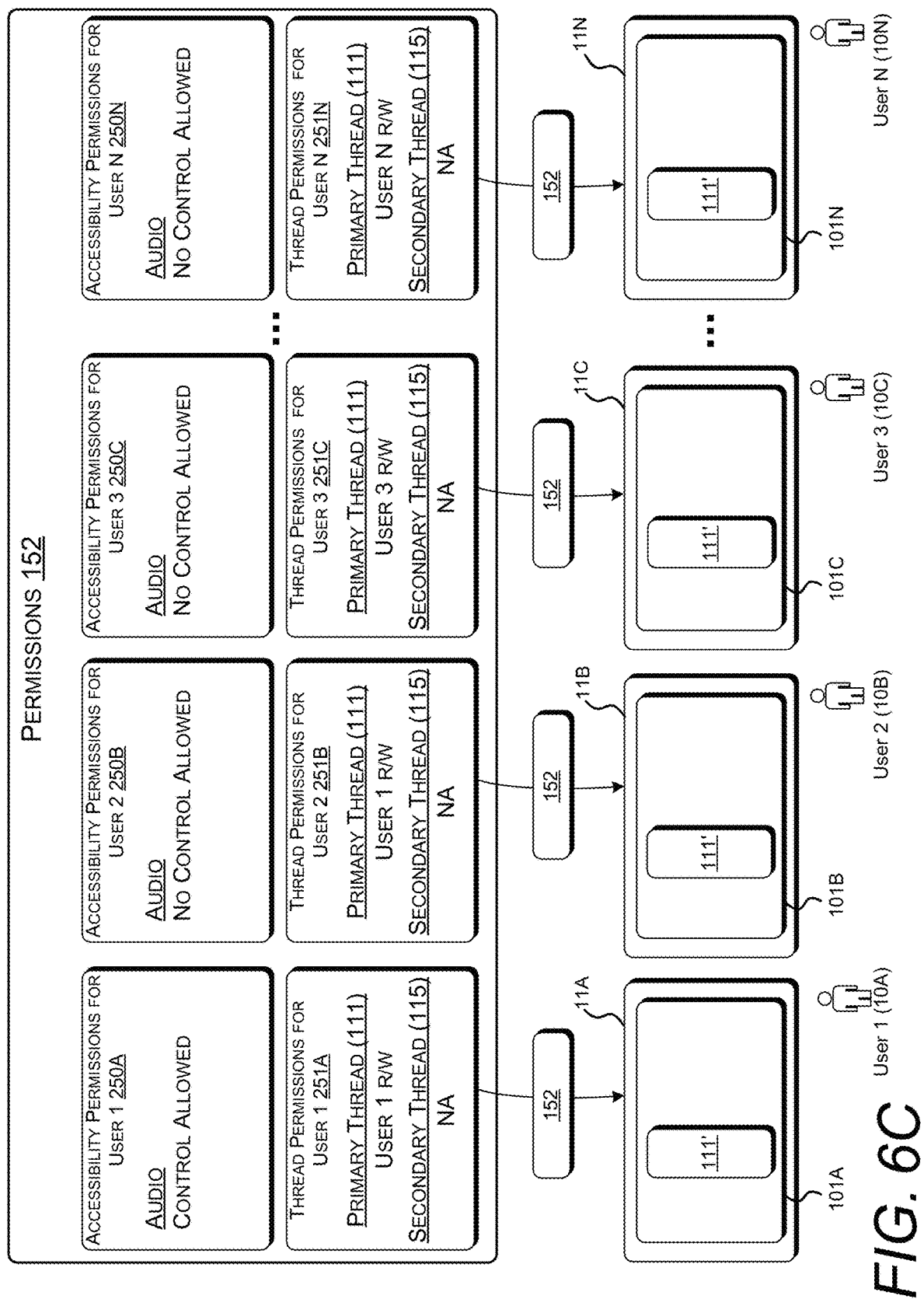
FIG. 6C illustrates a set of permissions that allows a system to merge messages from two separate message threads to a single updated thread upon completion of a presentation from a user.

FIGS. 6A-6C show the changes of the permissions throughout the process described above with respect to FIG. 5A-5D. In this case, as shown in FIG. 6A, the first user has the ability to invoke the operating state change of the system. The other users do not have the appropriate accessibility permissions to change the operating state of the system. In this state of the permissions, each user has the ability to read and write to the original thread 111, e.g., the primary thread. A shown in FIG. 6B, in response to the first user providing an input to change the operating state of the system, the system can modify the thread permissions of the other users 10B-10N, and restrict those users from being able to contribute to a new thread 115 but at the same time give those users the right to contribute messages to the original thread 111. In this state of the permissions, the first user is the only user that can write messages to the original thread. Once the user has completed their presentation, as shown in FIG. 6C, the system can change the state of the thread permissions back to their original state and show only the original thread and allow all users to contribute to the original thread.

Figure 7B:
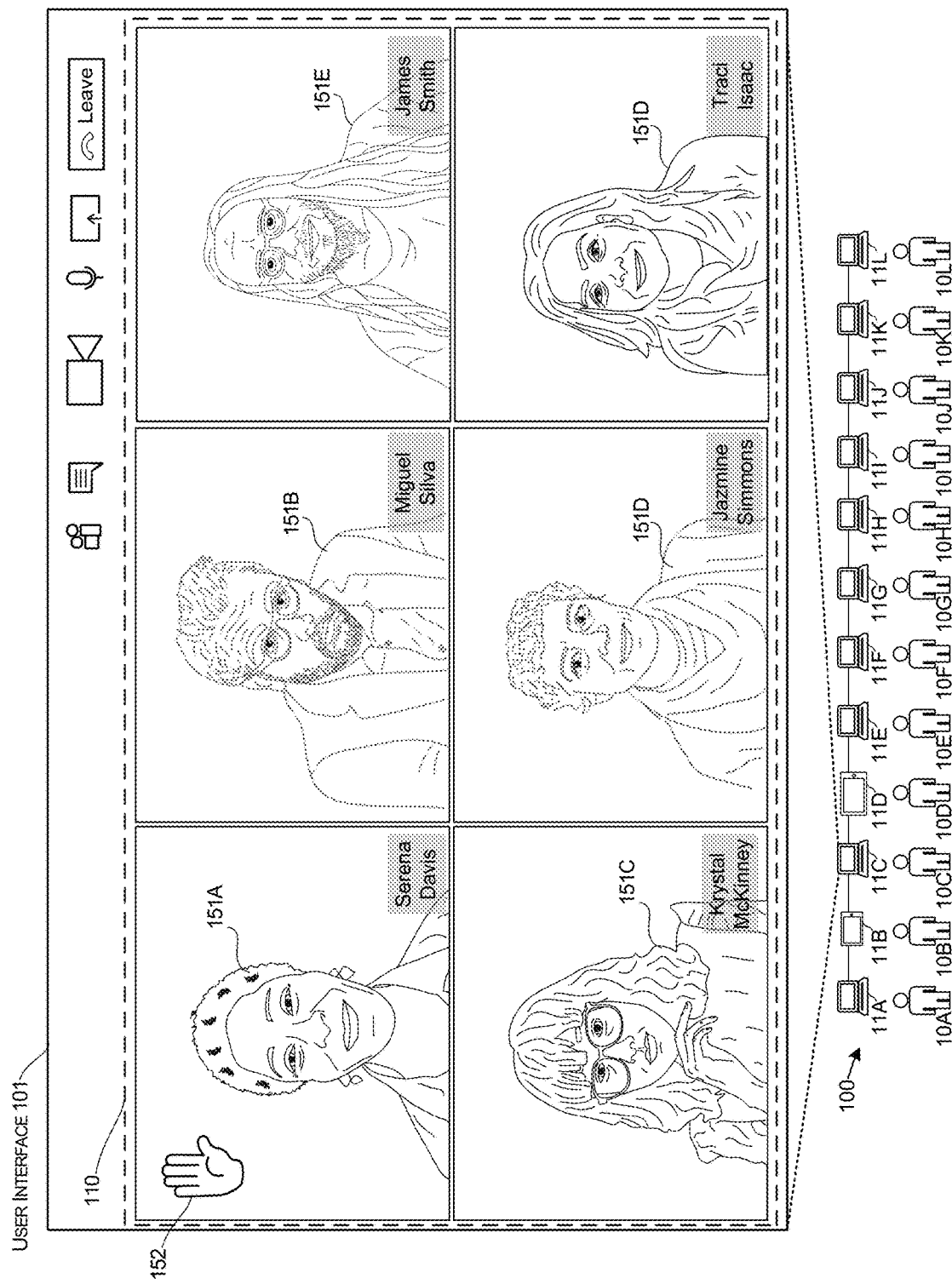
FIG. 7B illustrates a first user interface arrangement showing a plurality of users participating in a communication session and a first user providing an input to invoke a state change of the system.
Figure 7F:
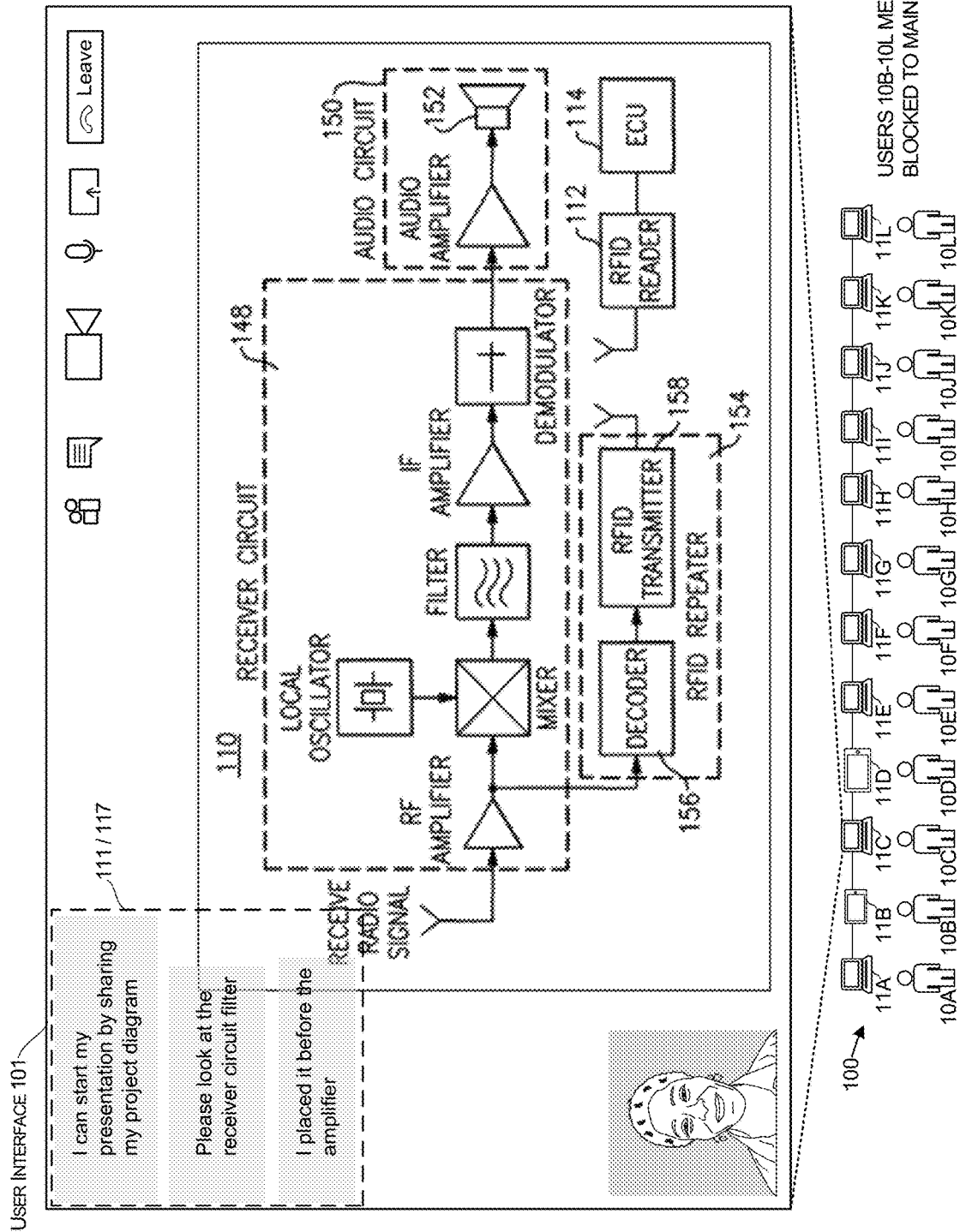
FIG. 7F illustrates a user interface arrangement showing a message thread that is superimposed over an image of content presented with an image of a user who is allowed to exclusively provide messages to the message thread.

Turning now to FIG. 7A-7H other user interface arrangements are shown and described below. For instance, FIG. 7A shows a user interface that displays renderings of individual users participating in a communication session. This particular user interface does not initially show a message thread. Then, as shown in FIG. 7B, when the first user 10A provides an input that indicates that the user has an interest in sharing information, e.g., by showing a hand raise gesture, the system generates a graphical element 152 to notify other users that the system is going to change the operating state. A shown in FIG. 7C, when the system transitions from the first operating state to a second operating state, the system starts to generate messages of a thread that is superimposed, at least in part, over an image of the user who provided the input. For example, the message thread maybe an existing message thread 111 that initially allowed all users to provide messages while the system operated in the first operating state, but then only allowed the first user to provide messages while the system operated in the second operating state. In another embodiment, the message thread that is superimposed over the user can also be a new message thread 117 that only accepts messages from the user who provided the input, e.g., the first user. In this case, the other users 10B-10E can provide message to an existing thread (not shown) if the system creates the new message thread 117 that only allows the first user to provide messages. The new message thread 117 can be in a new display region 117'. FIG. 7D illustrates another example of a user interface arrangement where a message thread that only accepts messages from the first user is rendered in a position that replaces the rendering of the first user. FIG. 7E illustrates yet another example of a user interface arrangement that shows an enlarged region within the video display area 110 that is reserved for an image of the first user. In this embodiment, the message thread is superimposed over the enlarged image of the user. FIG. 7F illustrates another example of a user interface arrangement that shows an enlarged region within the video display area 110 that is reserved for content shared by the first user. In this embodiment, the message thread is superimposed over the image of the shared content.

FIGS. 7G and 7H illustrate a user interface from the perspective of the first user. In the example of FIG. 7G, the message thread is not superimposed over the content and the user interface also provides an input text field 112 and an input element 113 configured for sending typed messages of the text field to the thread. In the example of FIG. 7H, the user interface shows a first message thread 111 that is configured to only allowed to accept messages from the first user, and a second message thread 115 that is configured to accept messages from all users. This allows the first user to provide a coherent presentation during a second mode of operation without allowing other users to interrupt the message thread. At the same time, this user interface arrangement allows the other users to continue sharing messages on a separate thread without interrupting the first user's presentation.

For illustrative purposes, consider a conferencing scenario, using Teams, Slack, or Google Hangouts, with User A not capable of providing a voice input. User A, the first user 10A, raises his hand, and when User A has the floor, the system permissions allow the user to rely on using the IM chat window to communicate his idea in real time using text. Alternatively, the system can generate a separate workspace and allow the user to enter text and other content into a whiteboard area of Teams. The issue with a conference call having many people, e.g., 10 people or more, there is a potential disruption from other messages received by other users that may flood the chat window during User A's presentation. User A would be typing and using several chats only to be interrupted with others' IMs. Thus, the system only allows User A to provide messages to the IM chat or the new whiteboard area.

To support accessibility in the above situation, User A has to be known to have accessibility issue with voice. That is, it is a designation in the Teams directory that shows User A has special needs. Alternatively, a coordinator/admin can designate User A as a person with special needs, and the designation is propagated to Teams directory as a temporary designation for the duration of the conference call. When User A has the floor, the text entered in the chat window or entered in other working space on the Teams client (e.g., whiteboard), the text is shown using the number of different configurations. For example, as shown in FIG. 7D, a text streaming video can replace the video of User A. As shown in FIGS. 7C and 7F, a text streaming video can be rendered near, or side-by-side, with the video of User A. As shown in FIG. 7E, the system can increase display region reserved for User A for a better user experience having video and text side-by-side or partially overlapping using a semi-transparent text video stream. As shown in FIG. 7F, the system can also allow the user to display shared content as part of a presentation along with a display of the message thread that is dedicated to only allowing the User A to provide messages.

The techniques behind the above-described embodiments utilizing text streams is based on A system that is configured to convert a text stream into a video stream. This conversion can occur locally on a client computer. Alternatively, as shown in FIG. 8, a server 602 can process this conversion. In the embodiment for the server, the system is configured to communicate text messages from each client computer to the server. The server can then convert the text messages and render them into a video stream. And some configurations, the system can utilize a video stream codec, such as H.264. The video stream is then overlaid or combined with a video of the user or shared content and communicated back to the clients for display to the users.

Figure 9:
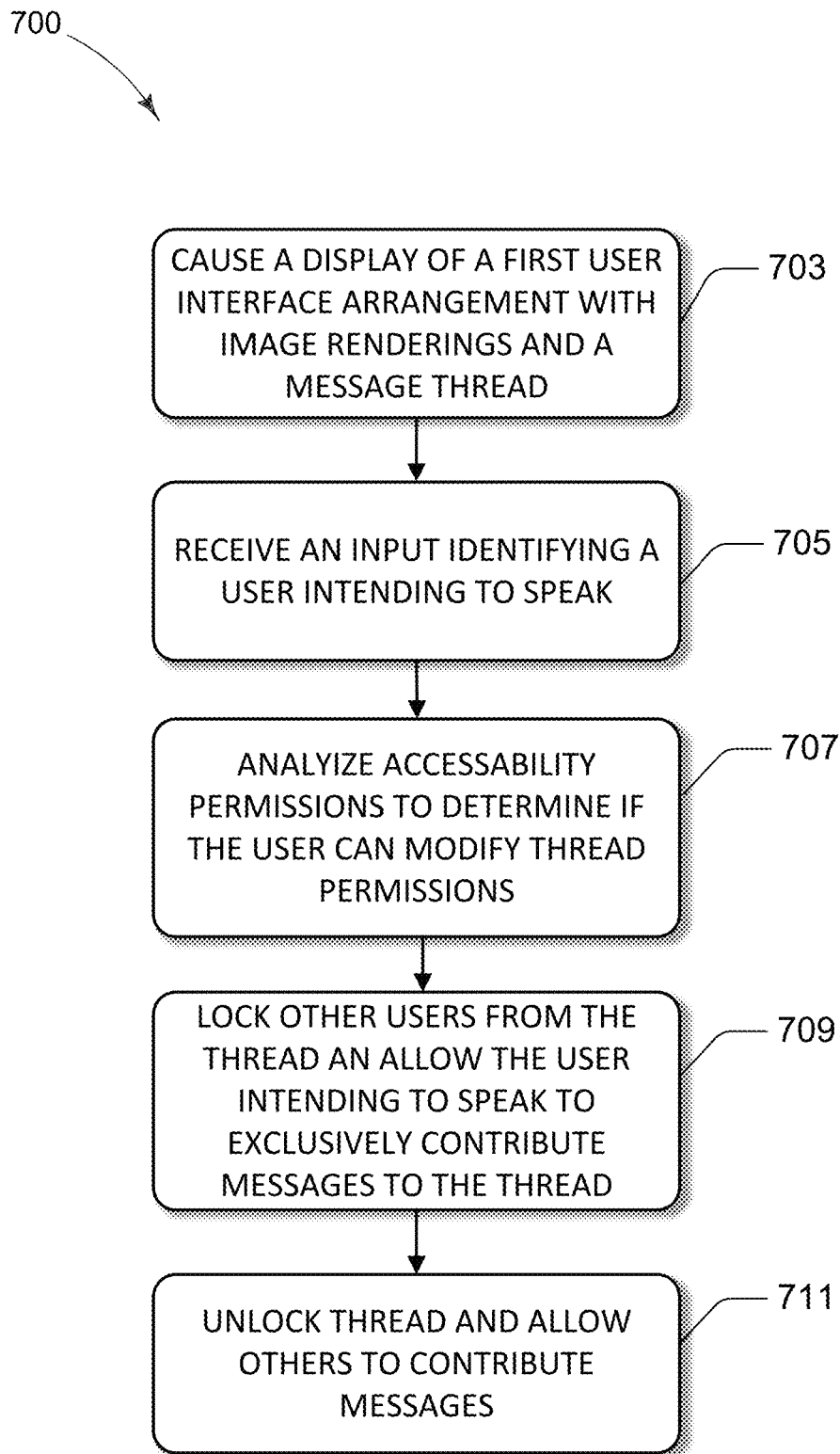
FIG. 9 is a flow diagram showing aspects of a routine for controlling permissions for a message thread based on an operating state of a system.

FIG. 9 is a diagram illustrating aspects of a routine 700 for providing automated control of permissions for a message thread. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can start or end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 9 and the other FIGURES can be implemented in association with the example user interfaces and systems described herein. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 700 includes an operation 703 where the system causes a display of a first user interface arrangement comprising image renderings of users and a message thread. Although the examples disclosed herein provide video renderings of users, it can be appreciated that the techniques disclosed here and can apply to a user interface displaying a message thread that is configured to control the messages that can be posted based on a user identity and associated permissions.

At operation 705, the system receives an input associated with a user 10A. The user input can include a user identity. The user input can indicate that a user wants to share information or provide a presentation. The input can invoke a state change within a device or cause an analysis of permissions to determine if permissions should be changed in response to the user input.

In some configurations, the input is received for initiating an operating state change of the system 100. The input causes the system 100 to transition from a first class of operations 788 to a second class of operations 789. The first class of operations 788 allowing a plurality of computing devices 11A-10L associated with a plurality of users 10A-10L to contribute messages 112 to the message thread 111. The second class of operations 789 allowing the computing device 11A of the user 10A to contribute messages 112 to the message thread 111 while restricting other computing devices 11B-11L of other users 10B-10L from contributing messages 112 to the message thread 111.

At operation 707, where the system can analyze accessibility permissions to determine if the user providing the input can modify thread permissions of other users, and prevent other users from contributing messages to a thread. As shown in the examples provided herein, a user such as the first user, may have accessibility permissions to modify thread permissions of other users. If a user does not have the correct accessibility permissions, the system can deny a user of the right to change thread permissions of other users. However, if a user does have the appropriate accessibility permissions, the process can proceed with that user or the user can change thread permissions of other users. In some cases, the user can provide an input to prevent other users from contributing messages to a particular message thread. In the example of FIG. 2B, the first user can provide an input that changes the thread permissions of other users. In this example, since the second user has no control permissions, the second user cannot provide an input that changes the thread permissions of other users.

At operation 709, the system can lock other users from contributing messages to a thread while allowing the user associated with the input to contribute messages to the message thread. The system only allows the user to prevent others from contributing messages to a thread if that user has appropriate accessibility permissions. In some configurations come on the thread can be locked by modifying user interface features to prevent users from entering a text message to a computing device. In other embodiments, the system may prevent a client computer to share a text message with a server or other client computers.

At operation 711, the system may unlock the thread and allow the other users to contribute messages to the thread in response to one or more events. In some configurations, the system may unlock a thread, and allow other users to contribute to the thread other than the presenter, when the presenter has completed a presentation. In other embodiments, the thread may be unlocked after other events such as receipt of a secondary input that indicates the user does not intend to share additional information. The secondary input can also be configured to change the operating state of the system, e.g., closet computing device to switch from the utilization of a second class of operations to the utilization of a first class of operations. Operation 711 can also include other activities that cause a system to revert back to original permissions. For instance, with respect to the example of FIG. 2A, the system may start with the original set of thread permissions and allow everyone to contribute to a particular thread. After a user provides a first input that indicates an intent to share information or give a presentation, the permissions transfer to a second set of permissions that restrict other users from contributing to a message thread. However, after a predetermined event, the system may revert back to the original message thread permissions. The pretty chairman event can also include an intent to stop sharing. For instance, if a user stops typing for a predetermined period of time, the system may determine that the user has completed their presentation. In addition, if the user types in certain keywords or key combinations, the system may determine that the user intends to complete a presentation. Add completion of the routine the system may also revert the user's accessibility permissions back to the original settings. For instance, if a user has control features in their accessibility permissions for the duration of the meeting, the system may change the accessibility permissions for that user to a setting, such as a "no control" setting, after the meeting has concluded. This means that the user only had the ability to change the thread permissions of other users during meeting and does not have that ability after the event, e.g., a meeting.

The routine can include operations that combine the features described herein. FIGS. 1A-1C, 2A-2C, 3A-3D, and 4A-4C: show operations for receiving an input for the hand raise accessibility feature for dynamically modifying meeting chat UI when a speaking-impaired user has the floor. The system can execute a method for controlling permissions for a message thread (111) of a virtual meeting session (604) between a plurality of users (10A-10L), the method executed on a data processing system (100) configured to operate in a first class of operations (788) and a second class of operations (789). As shown in FIG. 1B, 3B where the system receives the "hand raise" input for invoking the accessibility features, referred here as the "second class of operations", a method can include receiving text messages entered by a plurality of computing devices (11A-10L) associated with the users (10A-10L) and directed to the message thread; providing a first user interface in the first class of operations, wherein the first user interface includes an attendee display area (110) displaying a representation or video of at least one of the users, and a text message UI area (109) displaying the received text messages; receiving an input associated with a user (10A) of the virtual meeting session, the input including a command for initiating an operating state change of the system (100) to transition from the first class of operations (788) to the second class of operations (789). As shown in FIGS. 2A and 4A, the system can analyze the Teams Directory ("permissions") to determine if the user is eligible for accessibility features. For instance, in response to the received input for initiating the operating state change, analyzing permissions data (152) to determine whether a user privilege associated with the user (10A) associated with the input meets a permission requirement to invoke the operating state change of the system (100) from the first class of operations (788) to the second class of operations (789); and as shown in FIG. 1C and FIG. 2C: Based on the accessibility permissions, locking the other users from contributing messages to the message thread while the main user is allowed to contribute messages in response to determining that the permissions data (152) indicates that the user privilege of the user (10A) associated with the received input meets the permission requirement, causing the operating state of the system (100) to transition from the first class of operations (788) to the second class of operations (789) by: changing from providing the first user interface to providing a second user interface in the second class of operations, wherein the second user interface handles displaying text messages received from the user (11A) differently from text messages from other computing devices (11B-11L) by: displaying, in the text message UI area (109), text messages added to the message thread (111) by the user (10A) while restricting at least one of other computing devices (11B-11L) of other users (10B-10L) from contributing text messages (112) to the message thread (111); or providing, in the second user interface, (a) a first text message display area (111/115/117) for displaying text messages received from the user (10A), and (b) a second text message display area, different from the first text message display area, for displaying text messages added to the message thread (111) by other users (10B-10L).

FIGS. 1A-1C and 2A-2C show an embodiment of blocking the UI of others during the user's presentation. The block remains until the first user exits the presentation mode. The system can restrict other computing devices of other users from contributing messages to the message thread comprises, disabling at least one of a text entry field or a send button of a user interface displayed on the other computing devices, wherein the text entry field or the send button of the user interface remains disabled until a second input is received for initiating a second operating state change from the utilization of the second class of operations to the utilization of the first class of operations for providing, in the second user interface, (a) a first text message display area (111/115/117) for displaying text messages received from the user (10A), and (b) a second text message display area, different from the first text message display area, for displaying text messages added to the message thread (111) by other users (10B-10L).

FIGS. 3A-3C and 4A-4C show an embodiment of a second queue. The method herein also includes the first text message display area (111/115/117) for displaying text messages received from the user (10A) prevents the display of messages received from the other users.

FIG. 3D shows an embodiment where the messages from the secondary thread are merged after the presentation. The method herein also includes merging the messages from the secondary thread with the messages of the primary thread in response to receiving a second input for initiating a second operating state change from the utilization of the second class of operations to the utilization of the first class of operations.

FIG. 5C shows an embodiment where messages are displayed in association with the image of the user in grid mode. The method herein also includes, while the system is utilizing the second class of operations, causing the messages received from the computing device of the user to be displayed as an overlay on a video rendering of the user.

FIG. 5D shows an embodiment where messages replace the image of the user in grid mode. In the method, while the system is utilizing the second class of operations, causing the messages received from the computing device of the user to be displayed in a user interface arrangement comprising a plurality of renderings of images of the plurality of users, wherein the messages received from the computing device of the user are displayed as a replacement of a rendering of the user.

The system also manages permissions prevent the user from blocking other users if they do not have the appropriate accessibility permissions. The method may also include operations that prevent the system from invoking the operating state change of the system from the first class of operations to the second class of operations in response to determining that the permissions data does not designate the user with permissions to invoke the operating state change.

In other embodiments FIGS. 1A-1C, 2A-2C, 3A-3D, and 4A-4C show other aspects of the system that can receive an input for the hand raise accessibility feature for dynamically modifying meeting chat UI when a speaking-impaired user has the floor. The method for controlling permissions for a message thread (111) of a communication session (604), can include operations for receiving an input associated with a user (10A), the input received for initiating an operating state change of the system (100), wherein the input causes the system (100) to transition from a first class of operations (788) to a second class of operations (789), the first class of operations (788) allowing a plurality of computing devices (11A-10L) associated with a plurality of users (10A-10L) to contribute messages (112) to the message thread (111), the second class of operations (789) allowing the computing device (11A) of the user (10A) to contribute messages (112) to the message thread (111) while restricting other computing devices (11B-11L) of other users (10B-10L) from contributing messages (112) to the message thread (111). This operation can be shown in FIGS. 1B and 3B, where the system receives the "hand raise" input for invoking the accessibility features, referred here as the "second class of operations." Next, in response to the input for initiating the operating state change, analyzing permissions data (152) to determine that the user (10A) associated with the input is designated to invoke the operating state change of the system (100) from the first class of operations (788) to the second class of operations (789) that allow the computing device (11A) of the user (10A) to contribute messages (112) to the message thread (111) while restricting other computing devices (11B-11L) of other users (10B-10L) from contributing messages (112) to the message thread (111). This can be shown in FIGS. 2A and 4A where the system can analyze the Teams Directory ("permissions") to determine if the user is eligible for accessibility features. Then, in response to determining that the permissions data (152) indicates that the user (10A) associated with the input is designated to invoke the operating state change of the system (100) from utilization of the first class of operations (788) to utilization of the second class of operations (789), causing the system to invoke the operating state change of the system (100) from utilization of the first class of operations (788) to the utilization of the second class of operations (789), wherein the first class of operations (788) allows the plurality of computing devices (11A-10L) associated with the plurality of users (10A-10L) to contribute messages (112) to the message thread (111), and wherein the second class of operations (789) allows the computing device (11A)

of the user (10A) to contribute messages (112) to the message thread (111) while restricting other computing devices (11B-11L) of other users (10B-10L) from contributing messages (112) to the message thread (111). As shown in FIGS. 1C and FIG. 2C, based on the accessibility permissions, locking the other users from contributing messages to the message thread while the main user is allowed to contribute messages.

As shown in FIGS. 1A-1C and 2A-2C, specific to embodiments of blocking the UI of others during the user's presentation, the block remains until the first user exits the presentation mode. Here the method can include restricting other computing devices of other users from contributing messages to the message thread comprises, disabling at least one of a text entry field or a send button of a user interface displayed on the other computing devices, wherein the text entry field or the send button of the user interface remains disabled until a second input is received for initiating a second operating state change from the utilization of the second class of operations to the utilization of the first class of operations.

As shown in FIGS. 3A-3C and 4A-4C, specific embodiment of adding a second queue, wherein the message thread is a primary thread, wherein restricting other computing devices of other users from contributing messages to the message thread comprises: restricting the other computing devices of the other users from sending messages to the primary thread; generating a secondary thread that is reserved for receiving messages from the other computing devices of the other users; and causing a display of messages received from the other computing devices of the other users within the secondary thread, wherein the secondary thread is displayed concurrently with the primary thread on a user interface.

As shown in FIG. 3D, the messages from the secondary thread can be merged after the presentation. The method can include merging the messages from the secondary thread with the messages of the primary thread in response to receiving a second input for initiating a second operating state change from the utilization of the second class of operations to the utilization of the first class of operations.

A shown in FIG. 5C, the messages are displayed in association with the image of the user in grid mode. The method can include, while the system is utilizing the second class of operations, causing the messages received from the computing device of the user to be displayed as an overlay on a video rendering of the user.

As shown in FIG. 5D, messages can replace the image of the user in grid mode. The method can include utilizing the second class of operations, causing the messages received from the computing device of the user to be displayed in a user interface arrangement comprising a plurality of renderings of images of the plurality of users, wherein the messages received from the computing device of the user are displayed as a replacement of a rendering of the user.

Permissions can be used to prevent the user from blocking other users if they do not have the appropriate accessibility permissions. For example, the method can prevent the system from invoking the operating state change of the system from the first class of operations to the second class of operations in response to determining that the permissions data does not designate the user with permissions to invoke the operating state change.

Figure 10:
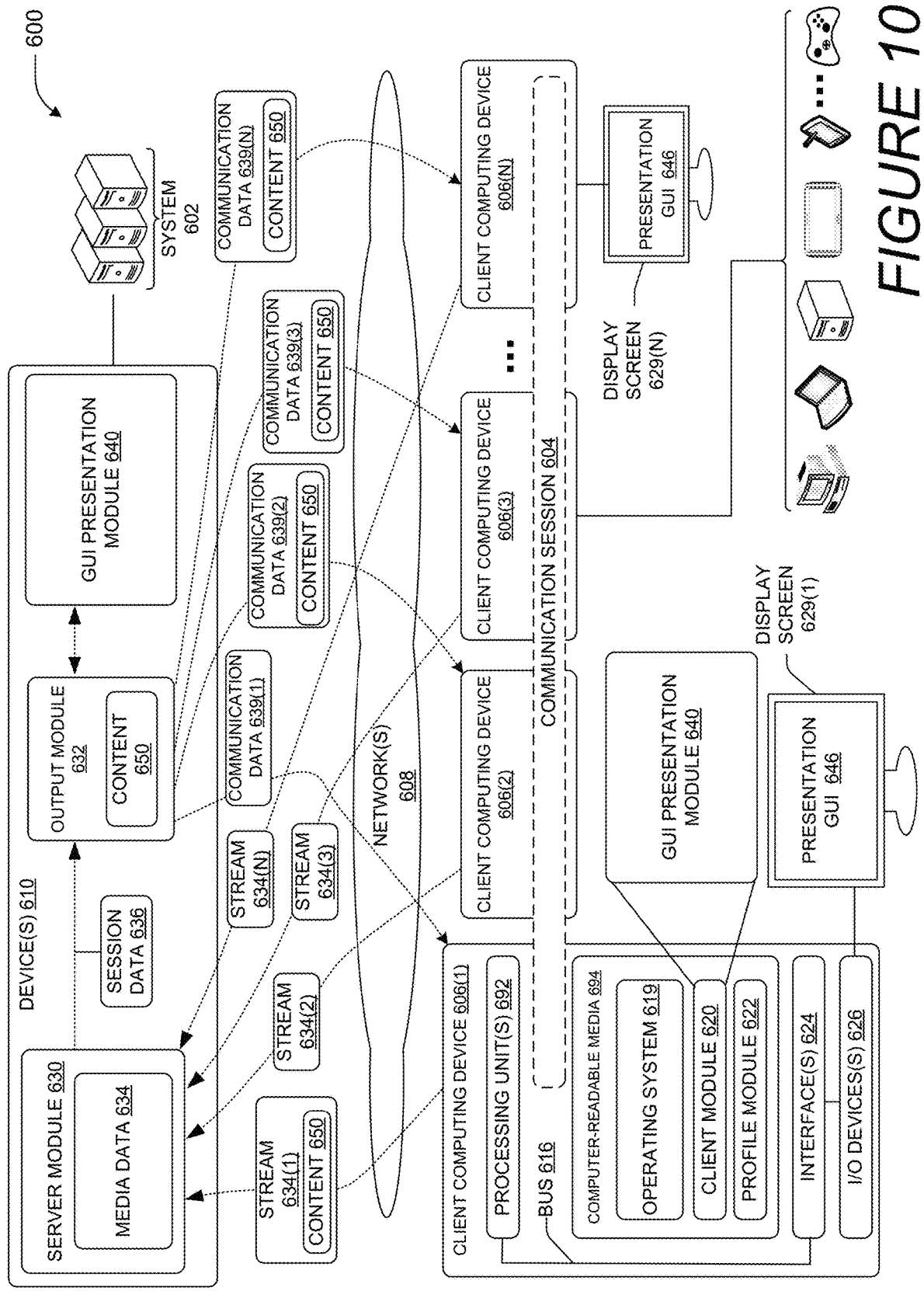
FIG. 10 is a computer architecture diagram illustrating an illustrative computer hardware and software architecture for a computing system capable of implementing aspects of the techniques and technologies presented herein.

FIG. 10 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 10 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 10 illustrates that client computing device 606(1) is in some way connected to a display device (e.g., a display screen 629(N)), which can display a UI according to the techniques described herein.

In the example environment 600 of FIG. 10, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 10) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 10, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer. The content 650 also include input data from each user, which can be used to control a direction and location of a representation. The content can also include instructions for sharing data and identifiers for recipients of the shared data. Thus, the content 650 is also referred to herein as input data 650 or an input 650.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 11:
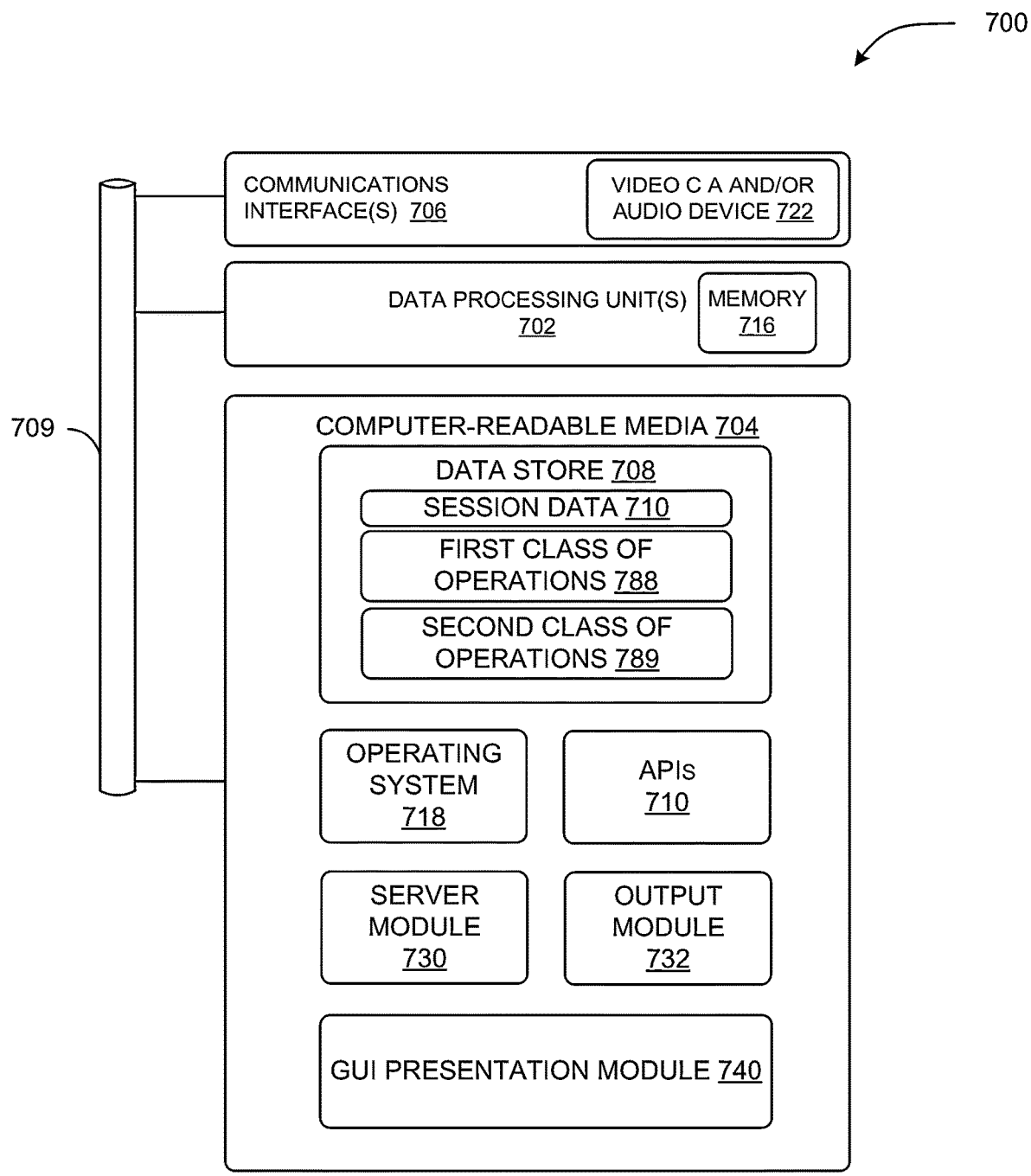
FIG. 11 is a computer architecture diagram illustrating a computing device architecture for a computing device capable of implementing aspects of the techniques and technologies presented herein.

FIG. 11 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as described herein). The session data 710 can include a total number of participants (e.g., users and/or client computing devices) in a communication session, activity that occurs in the communication session, a list of invitees to the communication session, and/or other data related to when and how the communication session is conducted or hosted.

The session data 710 can define any type of activity or status related to the individual users 10A-10L each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. This data 710 can also be fed into any of the models to help bring emphasis to keywords spoken by a person at a specific level, highlight a UI when a background sound of a person at a certain level is detected, or change a sentiment display in a particular way when a person at a certain level is detected has a certain sentiment.

The data store 708 may also include other data structures including a first class of operations 788 and a second class of operations 789. The first class of operations can include operations for analyzing permissions to determine if a user is allowed to restrict others from accessing or contributing to a thread. This first class of operations can also include operations that allow a user to exclusively contribute messages to a particular thread. The second class of operations can include operations that allow a particular user to contribute messages to a thread while also restricting other people from contributing messages to a thread. The system described herein can operate in a first operating mode that utilizes the first class of operations. The system described here and can also operate in a second operating mode that utilizes the second class of operations. A user can invoke a state change, also referred to hearing as an operating mode change, by the use of an input, which may include capturing a user's gestures using a camera. For instance, if the user raises their hand, a camera can capture an image of this movement. In response to determining that this movement has been made by a user, or any other like gesture, the system can provide an input to invoke an operating state change from the first class of operations to a second class of operations. An input for invoking an operating state change can include a keyboard entry, a touch pad input gesture, a voice command or any other input that may indicate a user's intent to create an event or interruption of a meeting that allows them to communicate additional information via a file, stream, text entry, a voice input, etc. For instance, a user may raise their hand in a meeting to invoke a state change in the system that allows them to transition to a presenter role from an audience role. A first operating state, also referred to herein as a state of operation that utilizes the first class of operations, is also refer to herein as the regular mode. A second operating state, also referred to herein as a state of operation that utilizes the second class of operations, is also refer to herein as a presentation mode.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 710 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method for controlling permissions for a first message thread of a virtual meeting session between a plurality of users, the method executed on a data processing system configured to operate in a first class of operations and a second class of operations, the method comprising:
receiving text messages entered by a plurality of computing devices associated with the users and directed to the first message thread;
providing a first user interface in the first class of operations, wherein the first user interface includes an attendee display area displaying a representation or live video of at least one of the users, and a UI displaying the received text messages;

receiving an input associated with a user of the virtual meeting session, the input including a command for initiating an operating state change of the system to transition from the first class of operations to the second class of operations, the input being a single input for causing a modification of permissions for at least two users associated with other computing devices to transition to a read-only mode for the first message thread while enabling the user to view and contribute messages to the first message thread;

in response to the received input for initiating the operating state change, analyzing permissions data to determine whether a user privilege associated with the user associated with the input meets a permission requirement to invoke the operating state change of the system from the first class of operations to the second class of operations; and in response to determining that the permissions data indicates that the user privilege of the user associated with the received input meets the permission requirement, causing the operating state of the system to transition from the first class of operations to the second class of operations by:

changing from providing the first user interface to providing a second user interface in the second class of operations by:

displaying, in the UI, text messages added to the first message thread by the user that initiated the operating state change, while restricting at least one of the other computing devices of the at least two users from sending text messages to the first message thread, during the restriction of the other computing devices of the at least two users to send new messages sent to the first thread:

generating a second thread that is reserved for receiving messages from the other computing devices of the at least two users, and causing a display of messages received from the other computing devices of the at least two users within the second thread, wherein the second thread is displayed concurrently with the first thread on a user interface.

2. The method of claim 1, wherein restricting the other computing devices of the at least two users from contributing messages to the first message thread comprises, disabling at least one of a text entry field or a send button of a user interface displayed on the other computing devices, wherein the text entry field or the send button of the user interface remains disabled until a second input is received for initiating a second operating state change from the utilization of the second class of operations to the utilization of the first class of operations for providing, in the second user interface, (a) a first text message display area for displaying text messages received from the user, and (b) a second text message display area, different from a first text message display area, for displaying text messages added to the second thread by the at least two users.

3. The method of claim 2, wherein the first text message display area for displaying text messages received from the user prevents the display of messages received from the at least two users.

4. The method of claim 3, wherein the method further comprises merging the messages from the second thread with the messages of the first message thread in response to receiving a second input for initiating a second operating state change from the utilization of the second class of operations to the utilization of the first class of operations.

5. The method of claim 1, while the system is utilizing the second class of operations, causing the messages received from the computing device of the user to be displayed as an overlay on a video rendering of the user.

6. The method of claim 1, while the system is utilizing the second class of operations, causing the messages received from the computing device of the user to be displayed in a user interface arrangement comprising a plurality of renderings of images of the plurality of users, wherein the messages received from the computing device of the user are displayed as a replacement of a rendering of the user.

7. The method of claim 1, wherein the system prevents the system from invoking the operating state change of the system from the first class of operations to the second class of operations in response to determining that the permissions data does not designate the user with permissions to invoke the operating state change.

8. The system of claim 1, wherein the instructions further cause the one or more processing units to merge the messages from the second thread with the messages of the first message in response to receiving a second input for initiating a second operating state change from the utilization of the second class of operations to the utilization of the first class of operations.

9. The method of claim 1, further comprising: modifying the permissions data to restrict the at least one of the other computing devices of the at least two users, while maintaining the permissions data to allow the at least one of the other computing devices of the at least two users to receive text messages added to the first message thread from a time of the time associated the receipt of the input for initiating the operating state change of the system to transition from the first class of operations to the second class of operations.

10. The method of claim 1, wherein the restriction of the first message thread applies to messages sent from the at least one of the other computing devices of the at least two users after a time associated with the receipt of the input.

11. A system for controlling permissions for a first message thread of a communication session, the system comprising:

one or more processing units; and a computer-readable storage medium having encoded thereon computer-executable instructions to cause the one or more processing units to:

receive text messages entered by a plurality of computing devices associated with the users and directed to the first message thread;

provide a first user interface in the first class of operations, wherein the first user interface includes an attendee display area displaying a representation or live video of at least one of the users, and a UI displaying the received text messages;

receive an input associated with a user of the virtual meeting session, the input including a command for initiating an operating state change of the system to transition from the first class of operations to the second class of operations, the input being a single input for causing a modification of permissions for at least two users associated with other computing devices to transition to a read-only mode for the first message thread while enabling the user to view and contribute messages to the first message thread;

in response to the received input for initiating the operating state change, analyzing permissions data to determine whether a user privilege associated with the user associated with the input meets a permission requirement to invoke the operating state change of the system from the first class of operations to the second class of operations; and in response to determining that the permissions data indicates that the user privilege of the user associated with the received input meets the permission requirement, cause the operating state of the system to transition from the first class of operations to the second class of operations by:

changing from providing the first user interface to providing a second user interface in the second class of operations by:

displaying, in the UI, text messages added to the first message thread by the user that initiated the operating state change, while restricting at least one of the other computing devices of the at least two users from sending text messages to the first message thread, during the restriction of the other computing devices of the at least two users to send new messages sent to the first thread;

generating a second thread that is reserved for receiving messages from the other computing devices of the at least two users, and causing a display of messages received from the other computing devices of the at least two users within the second thread, wherein the second thread is displayed concurrently with the first thread on a user interface.

12. The system of claim 11, wherein restricting the other computing devices of the at least two users from contributing messages to the first message thread comprises, disabling at least one of a text entry field or a send button of a user interface displayed on the other computing devices, wherein the text entry field or the send button of the user interface remains disabled until a second input is received for initiating a second operating state change from the utilization of the second class of operations to the utilization of the first class of operations.

13. The system of claim 11, while the system is utilizing the second class of operations, causing the messages received from the computing device of the user to be displayed as an overlay on a video rendering of the user.

14. The system of claim 11, while the system is utilizing the second class of operations, causing the messages received from the computing device of the user to be displayed in a user interface arrangement comprising a plurality of renderings of images of the plurality of users, wherein the messages received from the computing device of the user are displayed as a replacement of a rendering of the user.

15. The system of claim 11, wherein the system prevents the system from invoking the operating state change of the system from the first class of operations to the second class of operations in response to determining that the permissions data does not designate the user with permissions to invoke the operating state change.

16. A computer-readable storage medium having encoded thereon computer-executable instructions to cause one or more processing units of a system to control permissions for a message thread of a communication session, wherein the instructions to cause one or more processing units to:

receive text messages entered by a plurality of computing devices associated with the users and directed to the first message thread;

provide a first user interface in the first class of operations, wherein the first user interface includes an attendee display area displaying a representation or live video of at least one of the users, and a UI displaying the received text messages;

receive an input associated with a user of the virtual meeting session, the input including a command for initiating an operating state change of the system to transition from the first class of operations to the second class of operations, the input being a single input for causing a modification of permissions for at least two users associated with other computing devices to transition to a read-only mode for the first message thread while enabling the user to view and contribute messages to the first message thread;

in response to the received input for initiating the operating state change, analyzing permissions data to determine whether a user privilege associated with the user associated with the input meets a permission requirement to invoke the operating state change of the system from the first class of operations to the second class of operations; and in response to determining that the permissions data indicates that the user privilege of the user associated with the received input meets the permission requirement, cause the operating state of the system to transition from the first class of operations to the second class of operations by:

changing from providing the first user interface to providing a second user interface in the second class of operations by:

displaying, in the UI, text messages added to the first message thread by the user that initiated the operating state change, while restricting at least one of the other computing devices of the at least two users from sending text messages to the first message thread, during the restriction of the other computing devices of the at least two users to send new messages sent to the first thread:

generating a second thread that is reserved for receiving messages from the other computing devices of the at least two users, and causing a display of messages received from the other computing devices of the at least two users within the second thread, wherein the second thread is displayed concurrently with the first thread on a user interface.

17. The computer-readable storage medium of claim 16, wherein the instructions further cause the one or more processing units to merge the messages from the second thread with the messages of the first message thread in response to receiving a second input for initiating a second operating state change from the utilization of the second class of operations to the utilization of the first class of operations.

18. The computer-readable storage medium of claim 16, while the system is utilizing the second class of operations, causing the messages received from the computing device of the user to be displayed as an overlay on a video rendering of the user.

19. The computer-readable storage medium of claim 16, while the system is utilizing the second class of operations, causing the messages received from the computing device of the user to be displayed in a user interface arrangement comprising a plurality of renderings of images of the plurality of users, wherein the messages received from the computing device of the user are displayed as a replacement of a rendering of the user.

\* \* \* \* \*